US012450816B2

(12) United States Patent
Zhu

(10) Patent No.: US 12,450,816 B2
(45) Date of Patent: Oct. 21, 2025

(54) APPEARANCE EDITING METHOD AND APPARATUS FOR VIRTUAL PET, TERMINAL, AND STORAGE MEDIUM

(71) Applicant: Tencent Technology (Shenzhen) Company Limited, Guangdong (CN)

(72) Inventor: Yingting Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 198 days.

(21) Appl. No.: 18/325,617

(22) Filed: May 30, 2023

(65) Prior Publication Data
US 2023/0298253 A1 Sep. 21, 2023

Related U.S. Application Data

(63) Continuation of application No. PCT/CN2022/118479, filed on Sep. 13, 2022.

(30) Foreign Application Priority Data
Nov. 5, 2021 (CN) .............................. 202111308492

(51) Int. Cl.
G06T 15/04 (2011.01)
G06T 3/40 (2024.01)
G06V 10/56 (2022.01)

(52) U.S. Cl.
CPC ............... *G06T 15/04* (2013.01); *G06T 3/40* (2013.01); *G06V 10/56* (2022.01)

(58) Field of Classification Search
CPC ........... G06T 15/04; G06T 3/40; G06T 19/00; G06V 10/56; A63F 13/52; A63F 13/63; A63F 2300/308; A63F 2300/66
See application file for complete search history.

(56) References Cited

U.S. PATENT DOCUMENTS 10,777,010 B1   9/2020 Patel et al.
2006/0221090 A1* 10/2006 Takeshima .............. G06T 7/194
                                                    345/582

(Continued)

FOREIGN PATENT DOCUMENTS

CN   105233498 A      1/2016
CN   109126136 A  *   1/2019  ........... A63F 13/825

(Continued)

OTHER PUBLICATIONS

CN-109126136-A (Machine Translation on Feb. 6, 2024).*

(Continued)

Primary Examiner — Michael Le
(74) Attorney, Agent, or Firm — Sughrue Mion, PLLC

(57) ABSTRACT

An appearance editing method and apparatus for a virtual pet are provided. The process may include obtain a first texture mapping of the virtual pet, the first texture mapping comprising a first appearance feature of the virtual pet; generate a target texture mapping corresponding to the a target appearance feature in response to an editing operation on the target appearance feature, wherein the target appearance feature is different than the first appearance feature; obtain a target texture mapping of the virtual pet by overlaying the first texture mapping of the virtual pet with at least one layer of the target texture mapping, wherein target masked texture mapping at different levels correspond to different target appearance feature; and apply the target texture mapping to a three-dimensional model of the virtual pet.

19 Claims, 17 Drawing Sheets

(56) References Cited

U.S. PATENT DOCUMENTS

| | | | | |
|---|---|---|---|---|
| 2011/0115787 A1* | 5/2011 | Kadlec | ................... | G06T 7/12 |
| | | | | 702/14 |
| 2017/0287183 A1* | 10/2017 | Kumar | ................... | G06T 5/77 |
| 2018/0300863 A1* | 10/2018 | Zhang | ................ | G06F 16/9535 |
| 2021/0012455 A1* | 1/2021 | Guo | ...................... | G06T 7/10 |

FOREIGN PATENT DOCUMENTS

| | | | | | | |
|---|---|---|---|---|---|---|
| CN | 110322535 A | | 10/2019 | | | |
| CN | 111951408 A | * | 11/2020 | ............. | G06T 5/50 |
| CN | 112598785 A | * | 4/2021 | ........... | G06T 19/006 |
| CN | 113223133 A | * | 8/2021 | ............. | G06T 7/90 |
| CN | 113546411 A | | 10/2021 | | | |
| CN | 114028808 A | | 2/2022 | | | |

OTHER PUBLICATIONS

CN-112598785-A (Machine Translation on Feb. 6, 2024).*
CN-113223133-A (Machine Translation on Feb. 6, 2024).*
CN-111951408-A (Machine Translation on Feb. 6, 2024).*
International Search Report of PCT/CN2022/118479 dated Nov. 25, 2022 [PCT/ISA/210].
Written Opinion of PCT/CN2022/118479 dated Nov. 25, 2022 [PCT/ISA/237].
Communication dated Aug. 28, 2024 issued in Chinese application No. 202111308492.7.

* cited by examiner

APPEARANCE EDITING METHOD AND APPARATUS FOR VIRTUAL PET, TERMINAL, AND STORAGE MEDIUM

CROSS-REFERENCES TO RELATED APPLICATIONS

This application claims priority to International Application No. PCT/CN2022/118479, filed with the China National Intellectual Property Administration on Sep. 13, 2022, which claims priority to Chinese Patent Application No. 202111308492.7, filed with the China National Intellectual Property Administration on Nov. 5, 2021, the disclosure of which are incorporated herein in their entireties.

FIELD

Embodiments of this application relate to the field of human-computer interactions, and in particular relate to a method and apparatus for an appearance editing for a virtual pet.

BACKGROUND

There are many virtual pets in game application programs, and users can raise virtual pets with different appearance features by changing body models, facial features, hair features and the like of the virtual pets.

SUMMARY

Embodiments of this application provide an appearance editing method and apparatus for a virtual pet, a terminal, and a storage medium. Target mappings are formed by overlaying mappings with target matte mappings (also referred to as masked texture mapping) at different levels, so that different target mappings are generated by adjusting the target matte mapping, which increases the degree of freedom of editing an appearance of a virtual pet and enriching appearance features of the virtual pet.

An embodiment of the present disclosure relates to a method for editing an appearance of a virtual pet. The method may include obtaining a first representation of the virtual pet, the first representation comprising a first appearance feature of the virtual pet; generating a target matte representation corresponding to the a target appearance feature in response to an editing operation on the target appearance feature, wherein the target appearance feature is different than the first appearance feature; obtaining a target representation of the virtual pet by overlaying the first representation of the virtual pet with at least one layer of the target matte representation, wherein target matte mappings at different levels correspond to different target appearance feature; and applying the target representation to a three-dimensional model of the virtual pet.

An embodiment of the present disclosure relates to an apparatus for editing an appearance of a virtual pet. The apparatus may include at least one memory configured to store computer program code; and at least one processor configured to access the at least one memory and operate according to the computer program code. The program code may include first obtaining code configured to cause the at least one processor to obtain a first representation of the virtual pet, the first representation comprising a first appearance feature of the virtual pet; first generating code configured to cause the at least one processor to generate a target matte representation corresponding to the a target appearance feature in response to an editing operation on the target appearance feature, wherein the target appearance feature is different than the first appearance feature; second obtaining code configured to cause the at least one processor to obtain a target representation of the virtual pet by overlaying the first representation of the virtual pet with at least one layer of the target matte representation, wherein target matte mappings at different levels correspond to different target appearance feature; and first applying code configured to cause the at least one processor to apply the target representation to a three-dimensional model of the virtual pet.

An embodiment of the present disclosure relates to a non-transitory computer-readable medium storing a program which, when executed by at least one processor, causes the at least one processor to at least obtain a first representation of the virtual pet, the first representation comprising a first appearance feature of the virtual pet; generate a target matte representation corresponding to the a target appearance feature in response to an editing operation on the target appearance feature, wherein the target appearance feature is different than the first appearance feature; obtain a target representation of the virtual pet by overlaying the first representation of the virtual pet with at least one layer of the target matte representation, wherein target matte mappings at different levels correspond to different target appearance feature; and apply the target representation to a three-dimensional model of the virtual pet.

DETAILED DESCRIPTION

Figure 1:
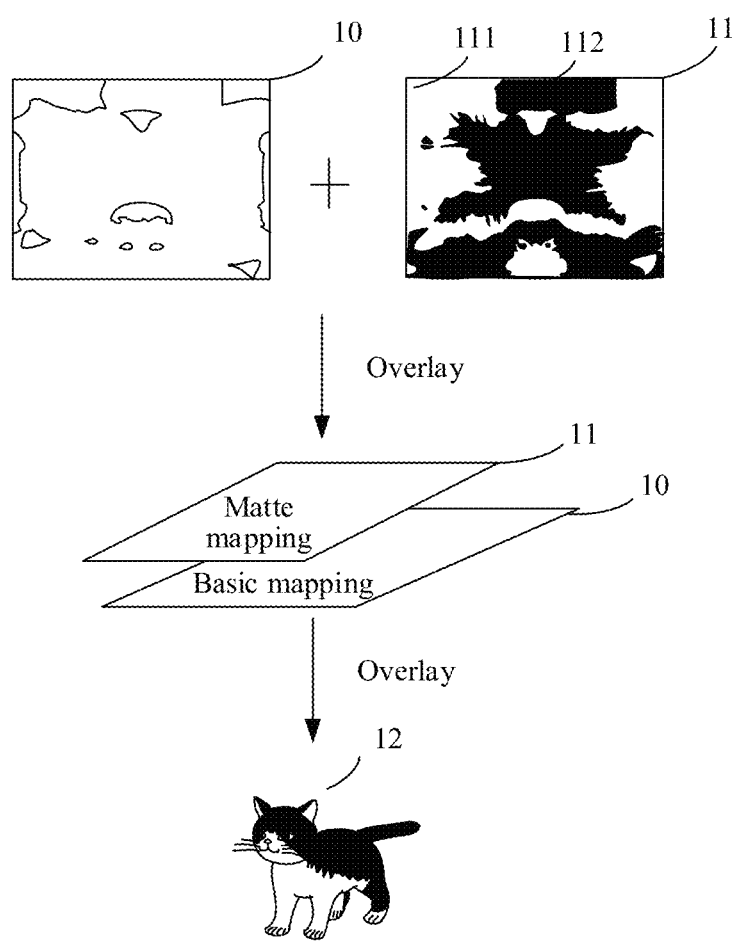
FIG. 1 shows a schematic diagram of a mask area and a non-mask area according to one exemplary embodiment of this application.

To make the objectives, technical solutions, and advantages of this application clearer, the following further describes implementations of this application in detail with reference to the accompanying drawings.

"A Plurality of" mentioned here means two or more. "And/or" describes an association relation for associated objects and represents that three relationships may exist. For example, A and/or B may represent: only A exists, both A and B exist, and only B exists. The character "/" usually indicates an "or" relation between associated objects.

Terms described in the embodiments of this application are introduced first:

Virtual pet: It is a digital pet presented in the form of a cartoon and/or animal. The virtual pet is a two-dimensional digital pet or a three-dimensional digital pet. For example, the virtual pet is a three-dimensional virtual pet presented as a cat. Optionally, pet images of some virtual pets are randomly generated. Optionally, pet images of some virtual pets are generated on the basis of a genetic rule according to pet images of virtual pets serving as parents and/or virtual pets of other forefathers. This embodiment of this application does not limit this.

In some embodiments, virtual pets are digital pets showed by an application run on a terminal. This application includes at least one of the following functions: grabbing a virtual pet, generating a virtual pet, breeding a virtual pet, trading a virtual pet, using a virtual pet for combat, performing augmented reality (AR) interaction using a virtual pet, using a virtual pet for social contact, and performing AR education using a virtual pet. In some other embodiments, the application is an application for obtaining, breeding and/or trading virtual pets on the basis of a blockchain system. In some other embodiments, the application is a location-based social game program that provides at least one function of using a virtual pet for collection, growth, and/or combat.

Appearance feature: Appearance features refer to features that reflect a pet image of a virtual pet. Optionally, the appearance features of a virtual pet include different body parts such as the hairs, the dapple, the eyes, the nose, the mouth, the beards, and the ears. Each body part can have many different appearance features. The above appearance features can also include visible features such as a color, a shape, and a texture. For example, the appearance features of the hairs may be white, gray, black, yellow, orange, and the like. The appearance features of the dapple may be a dot dapple, a block dapple, a flaky dapple, a spot dapple, a strip dapple, and the like. The appearance features of the ears may be different shapes such as long ears, short ears, rolled ears, folded ears, and normal ears. In addition, sizes, heights, and positions of some appearance features may also be adjusted to present different appearance features. For example, the size and height of the nose, the height of the mouth, the opening and closing degree of the lips, and the size of the ears ca be adjusted. This embodiment of this application does not limit this.

Mapping: It refers to a layer attached to a surface of a virtual pet model to form appearance features of a virtual pet. Different mappings represent different appearance features, and multiple mappings are overlaid in a level order and applied to virtual pet models to generate virtual pets with different appearance features. In this embodiment of this application, a mapping may be a basic mapping or a matte mapping. The basic mapping refers to a mapping with the lowest level, while the matte mapping is a mapping with a level higher than that of the basic mapping, which can be used to hide or display contents in layers with levels lower than its level. For example, as shown in FIG. 1, a basic mapping 10 and a matte mapping 11 are overlaid in a level order and are then applied to a virtual pet model to generate a virtual pet cat 12.

Matte mapping: It is a mapping used for masking a partial area of a lower layer of a mapping (which may be a basic mapping or a matte mapping), including a mask area and a non-mask area. After the matte mapping is overlaid on another mapping, an area, corresponding to the mask area in the matte mapping, in the another mapping is blocked, while an area corresponding to the non-mask area in the matte mapping is not blocked and can be observed through the matte mapping. Matte mapping is also referred to as UV mapping or texture mapping.

The technical solutions provided in the embodiments of this application have at least the following beneficial effects:

In the embodiments of this application, the mapping represents the appearance feature of the virtual pet; the target matte mapping represents the target appearance feature; the target appearance feature is an appearance feature other than the appearance feature represented by the mapping; and overlaying the mapping with the target matte mappings at different levels generates different target mappings that are applied to virtual pet models, thereby generating virtual pets with different appearance features. A target mapping is formed by overlaying a mapping with target matte mappings at different levels, so that adjusting the target matte mapping can generate different target mappings. On the one hand, a matching mapping is produced for one virtual pet. On the other hand, various virtual pets with different appearance features can be generated by using a limited number of art resources, thereby increasing the degree of freedom of editing an appearance of a virtual pet and enriching appearance features of the virtual pet.

For example, as shown in FIG. 1, the matte mapping 11 includes a mask area 112 and a non-mask area 111. When the basic mapping 10 is overlaid with the matte mapping 11, since the level of the matte mapping 11 is higher than that of the basic mapping 10, a content, corresponding to the mask area 112, in the basic mapping 10 is blocked, while a content corresponding to the non-mask area 111 is not blocked and can be observed through the matte mapping 11, ultimately presenting the appearance features of the virtual pet cat 12.

In related art, different appearance features of a virtual pet correspond to different mappings, and one mapping includes various appearance features, for example, a base color, a pattern, and a mitted color. Therefore, developers need to draw multiple mappings with different appearance features for selection in advance. From this, it can be seen that the number of art resources for creating a virtual pet is in a quantitative relationship with the degree of freedom of an appearance of the virtual pet. However, the production of virtual pet mappings takes a lot of time. Due to the one-to-one correspondence between appearance features of a virtual pet and corresponding mappings, the virtual pet has an extremely high appearance similarity.

In related art, in an application (App) involving virtual pets, a user often selects one of existing virtual pet models in the App, or can modify individual appearance features of the virtual pet. The reason is that a virtual pet model is made by replacing the model or mapping as a whole, that is, one mapping includes various appearance features of the virtual pet. Therefore, one mapping needs to be made once appearance features of one kind of virtual pet are added. For example, 20 kinds of virtual pets with different appearance features need to be presented in the App, so that 20 corresponding mappings need to be made. At the same time, the user can only make a choice from the 20 kinds of virtual pets. That is, the degree of freedom and the number of art resources, namely, mappings, of customizing appearances of virtual pets in a game are in a 1:1 quantitative relationship, and the appearance features of the virtual pets that users can select are limited.

In this embodiment of this application, a target mapping is formed by overlaying a layer of mapping and at least one layer of matte mapping. The appearance features are controlled by the mapping, and other appearance features other than the appearance features controlled by the mapping are adjusted by using different matte mappings, thereby achieving diversification of the appearance of the virtual pet. In addition, target matte mappings at different levels represent different appearance features of a virtual pet. The user can perform personalized customization on the appearance features of the virtual pet by performing an editing operation on the target matte mappings. Therefore, there is no need to make a mapping once the appearance features of one kind of virtual pet are added. In this embodiment of this application, multiple target matte mappings can be overlaid with one mapping. Changing the target matte mappings changes the appearance features of the virtual pet. On the one hand, the number of art resources is reduced, the time and cost of making mappings are saved, and at the same time, the appearance features of the virtual pet are enriched.

Figure 2:
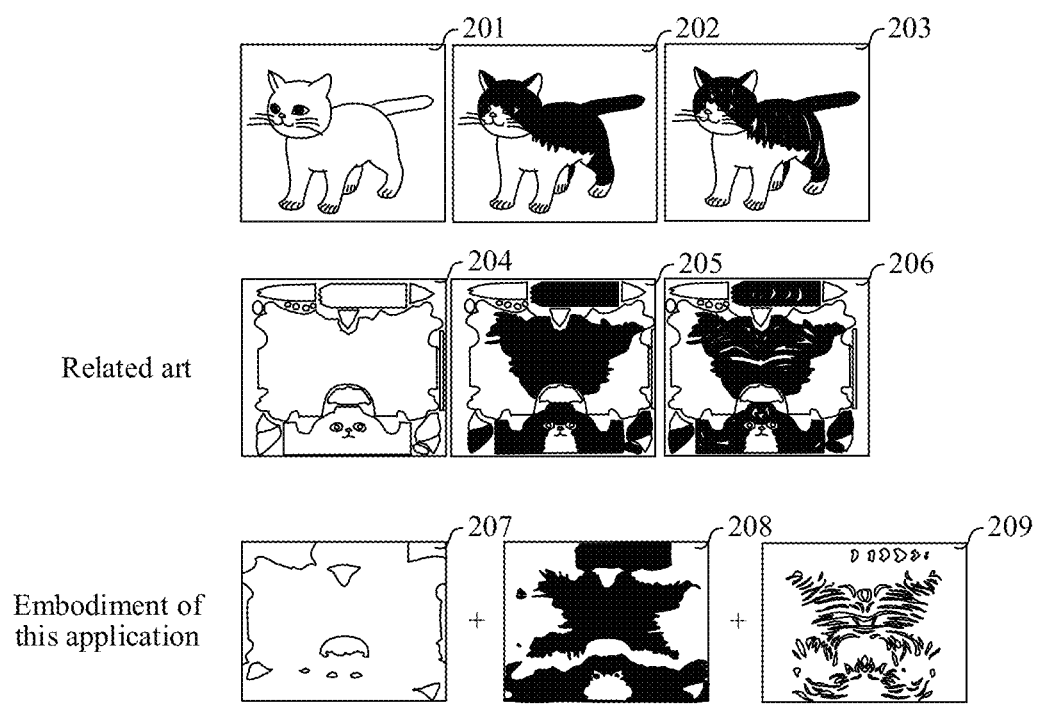
FIG. 2 shows a schematic diagram of a virtual pet mapping generation process according to one exemplary embodiment of this application.

For example, referring to FIG. 2, a virtual pet being a cat is taken as an example. If the application needs to present a white cat 201, black and white cat 202, and a black and white tabby cat 203, a white cat mapping 204, a black and white cat mapping 205, and a black and white tabby cat mapping 206 need to be separately made in the related art. If a cat with other appearance features needs to be presented, such as an orange cat, a corresponding orange cat mapping still needs to be made. In this embodiment of this application, the white cat 201, the black and white cat 202, and the black and white tabby cat 203 can be presented by combining and overlaying a mapping 207, a first target matte mapping 208, and a second target matte mapping 209. For example, the white cat 201 is generated by the mapping 207. The black and white cat 202 is formed by overlaying the mapping 207 with the first target matte mapping 208. The black and white tabby cat 203 is formed by overlaying the mapping 207, the first target matte mapping 208, and the second target matte mapping 209. Compared to the related art, it is not necessary to make a corresponding mapping for the appearances of each kind of cat. The appearance features of various kinds of different cats can be achieved by the mapping 207, the first target matte mapping 208, and the second target matte mapping 209.

The mapping 207 may be a basic mapping, that is, a mapping with the lowest level. An appearance feature represented by the mapping 207 is an appearance feature of any virtual pet cat, so that the mapping 207 can be used for making any virtual pet cat. An appearance feature represented by the first target matte mapping 208 is different from an appearance represented by the second target matte mapping. For example, the appearance feature represented by the mapping 207 is white hairs. The appearance feature represented by first target matte mapping 208 is black hairs. The appearance feature represented by second target matte mapping 209 is dappled hairs. The white cat 201 only has the appearance feature represented by the mapping 207 and does not have the appearance features represented by first target matte mapping 208 and the second target matte mapping 208. Therefore, the white cat 201 is only generated by the mapping 207. The black and white cat 202 has the appearance features represented by the mapping 207 and the first target matte mapping 208, so the black and white cat 202 is formed by overlaying the mapping 207 and the first target matte mapping 208. The black and white cat 203 has the appearance features represented by the mapping 207, the first target matte mapping 208, and the second target matte mapping 209. Therefore, the black and white cat 203 is generated by overlaying the mapping 207, the first target matte mapping 208, and the second target matte mapping 209.

Figure 3:
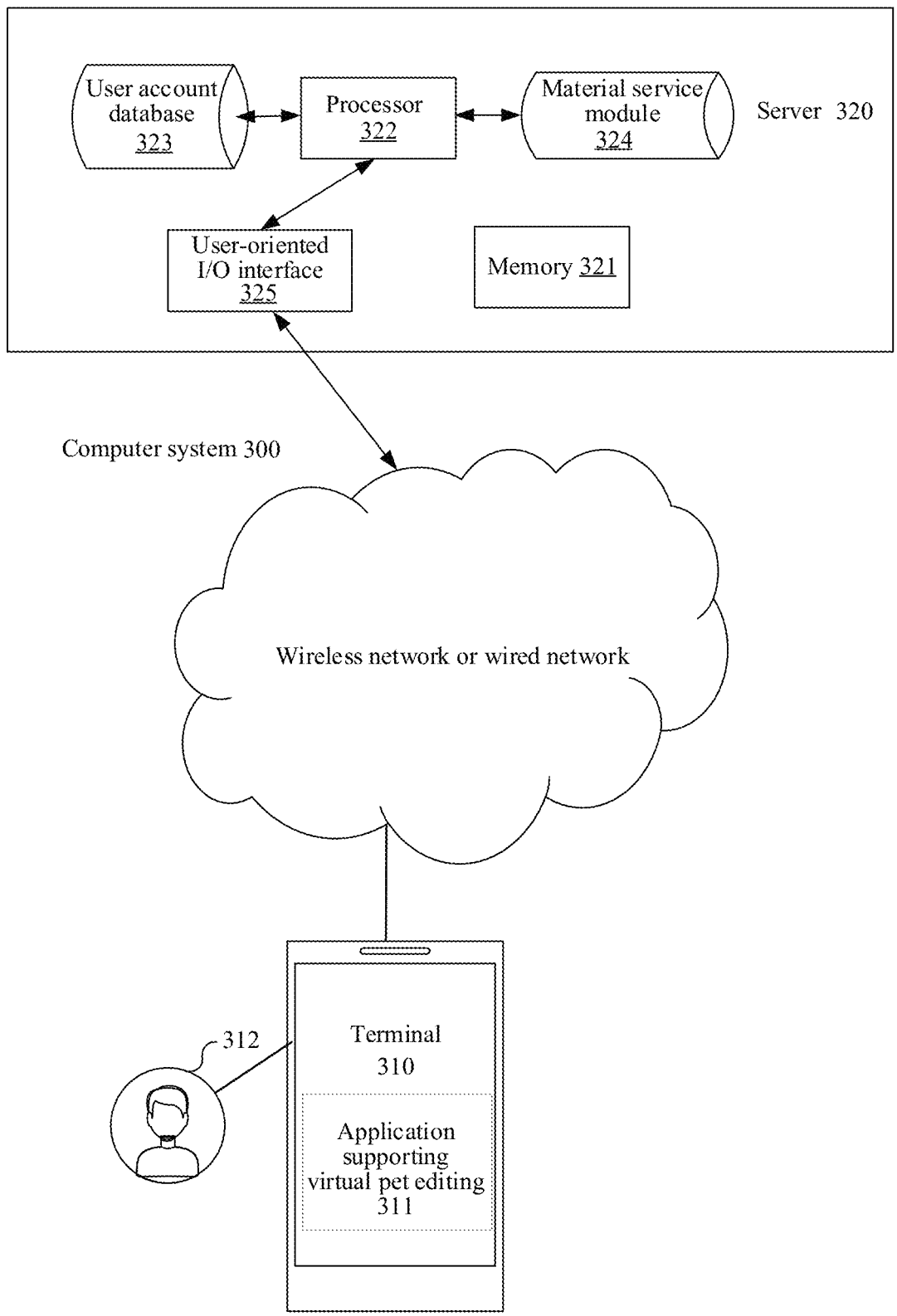
FIG. 3 shows a schematic diagram of an implementation environment according to one exemplary embodiment of this application.

In addition, the virtual pet generated using the appearance editing method for a virtual pet provided in this embodiment of this application can be applied to different applications which support an editing operation performed on the virtual pet. Optionally, the application may be a game application, a social application, and the like. This application embodiment does not limit this. The following is an example of the game application to illustrate an implementation environment of this embodiment of this application. Referring to FIG. 3, a schematic diagram of an implementation environment according to one embodiment of this application is shown. The implementation environment may include: a terminal 310 and a server 320.

The terminal 310 installs and runs an application 311 that supports virtual pet editing. When the terminal runs the application 311, a user interface of the application 311 is displayed on a screen of the terminal 310. The application 311 may be any type of a game application and a social application. In this embodiment of this application, the application 311 being a pet raising game is taken for example for explanation. The terminal 310 is a terminal used by a user 312. The user 312 uses the terminal 310 to customize and generate virtual pets with different appearance features, and controls the virtual pets for breeding, task completions, combat, and the like.

Optionally, the terminal 310 may generally refer to one of a plurality of terminals. Optionally, the terminal 310 may be at least one of a smartphone, a tablet computer, an ebook reader, a Moving Picture Experts Group Audio Layer III (MP3) player, a Moving Picture Experts Group Audio Layer IV (MP4) player, a laptop computer, and a desktop computer.

The terminal 310 is connected to the server 320 by using a wired network or wireless network.

The server 320 includes at least one of one server, a server cluster composed of multiple servers, a cloud computing platform, and a virtualization center. The server 320 is configured to provide background services for the application that supports virtual pet editing. Optionally, the server 320 undertakes main computing work, and the terminal 310 undertakes secondary computing work. Or, the server 320 undertakes secondary computing work, and the terminal 310 undertake primary computing work. Or, the server 320 and the terminal 310 adopt a distributed computing architecture for collaborative computation.

In one schematic example, the server 320 includes a memory 321, a processor 322, a user account database 323, a material service module 324, and user-oriented input/output (I/O) interface 325. The processor 322 is configured to load instructions stored in the server 320 and process data in the user account database 323 and the material service module 324. The user account database 323 is configured to store data of a user account of the terminal 310, such as a chathead of the user account, a nickname of the user account, a level of the user account, and a service area where the user account is located. The material service module 324 is configured to provide mappings and models of different kinds of virtual pets to support editing of virtual pets. The user-oriented I/O interface 325 is used for establishing communication and exchange data with the terminal 310 through the wireless or wired network. In addition, in the following embodiments, appearance editing of virtual pets can be independently completed by the terminal, by the server, or by the cooperation between the terminal and the server. This embodiment of this application does not limit this. For the convenience of expression, the following embodiments are illustrated using an example in which the terminal completes the appearance editing of the virtual pets.

Figure 4:
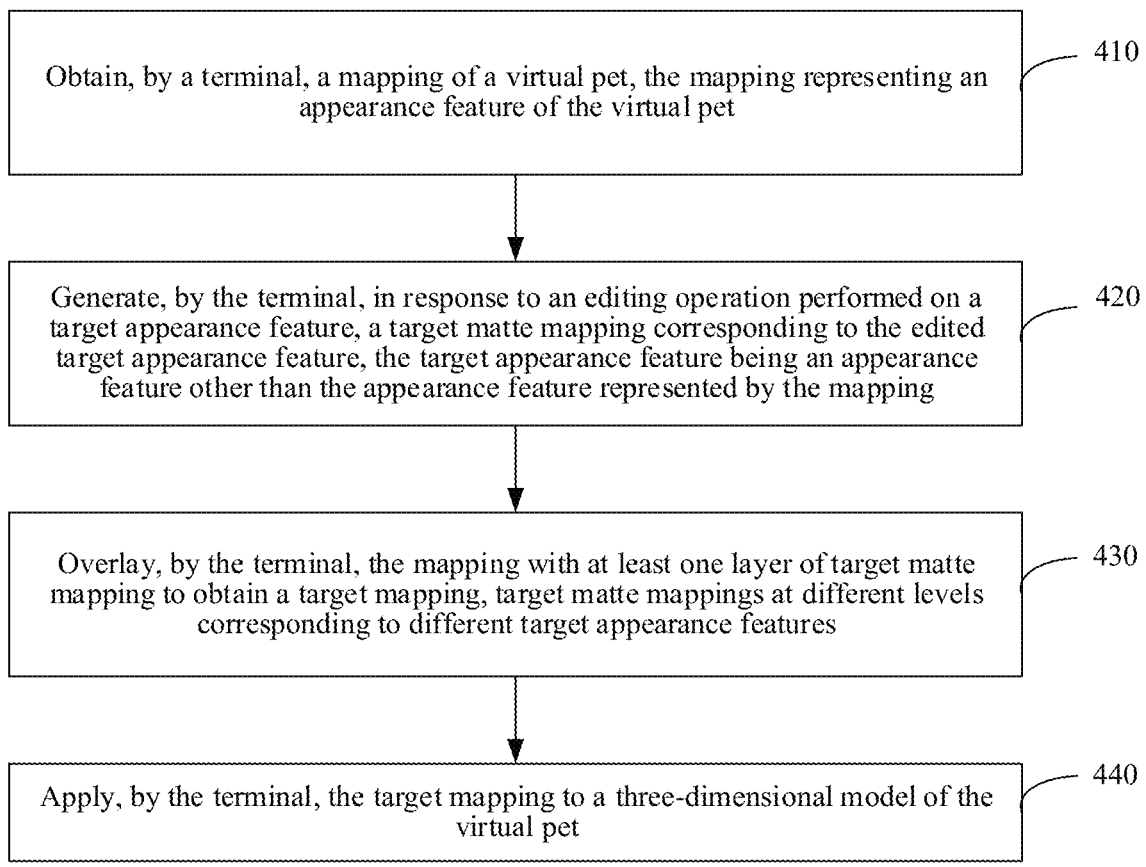
FIG. 4 shows a flowchart of an appearance editing method for a virtual pet according to one exemplary embodiment of this application.

Referring to FIG. 4, a flowchart of an appearance editing method for a virtual pet according to one exemplary embodiment of this application is shown. This embodiment of this application is explained by applying the method to the terminal 310 in the implementation environment shown in FIG. 3. The method includes the following steps:

Step 410. The terminal obtains a mapping of a virtual pet, the mapping representing an appearance feature of the virtual pet.

In one possible implementation, when a user triggers an application installed on the terminal, the terminal displays an appearance editing interface for a virtual pet and obtains the mapping of the virtual pet. Optionally, the mapping is a basic mapping. The basic mapping refers to a mapping with the lowest level. Other mappings (such as a matte mapping) may be overlaid on the top of the basic mapping, while the basic mapping may not be overlaid on the tops of other mappings. The appearance feature represented by the basic mapping is a basic appearance feature. The basic appearance feature refers to a common appearance feature of the same kind of virtual pets. For example, the basic appearance feature is a base hair color of the virtual pet.

In one possible implementation, the appearance feature of the virtual pet includes a body shape feature, a facial feature, and a hair feature. Optionally, the body shape feature represents whether the virtual pet is flat or thin, a size of the head, a width of the cheek, a size of a claw, a thickness and length of the tail, and the like. This embodiment of this application does not limit this. Optionally, the facial feature reflects sizes, shapes and the like of the ears, eyes, nose, and mouth of the virtual pet. This embodiment of this application does not limit this. Optionally, the hair feature reflects a base hair color, a color block of the base hair color, and the like. This embodiment of this application does not limit this.

Optionally, the mapping of the virtual pet is used for representing the base hair color of the virtual pet. The base hair color refers to a basic hair color of the virtual pet. The basic hair color is the most common hair color among the same kind of virtual pets and is the main color of the entire hairs of the virtual pet. Optionally, the basic hair color is common to the same kind of virtual pets.

Optionally, the base hair colors of different kinds of virtual pets may be the same or different.

In one possible implementation, in order to make the appearance features of the virtual pet closer to an animal in a real world, the type of the base hair color of the virtual pet may be summarized on the basis of a hair nature of a corresponding animal in the real world. For example, it can be concluded by analyzing the hair shapes of 15 different kinds of cats, including solid color cats, blue cats, orange cats, leopard cats, civet cats, shorthair cats, and garfield cats that hairs of cats are mainly white, gray, black, and yellow. Refer to Table I for details, where the hair shapes of the solid color cats are listed. Therefore, the virtual pet cat may have four types of mappings: white, gray, yellow, and black.

In one possible implementation, since the color types of the mappings are summarized on the basis of the hair nature of the corresponding animal in the real world, the color types of the mappings are fixed, which means that the hues of the mappings are fixed. A user can make different types of mappings by adjusting the brightnesses and saturations of the mappings. For example, the virtual pet cat has four types of mappings: white, gray, yellow, and black. The user can adjust the brightnesses and saturations of the mappings to obtain different types of mappings such as milky white, chocolate, light yellow, and dark brown, thereby enriching the appearance features of the virtual pet.

Step 420. The terminal generates, in response to an editing operation performed on a target appearance feature, a target matte mapping corresponding to the edited target appearance feature, the target appearance feature being an appearance feature other than the appearance feature represented by the mapping.

In this embodiment of this application, the target appearance feature is an additional feature of the virtual pet, and is another appearance feature other than the appearance feature represented by the mapping. Optionally, the appearance feature represented by the mapping is a basic appearance feature of the virtual pet, while the target appearance feature is an appearance feature other than the basic appearance feature. For example, if the appearance feature represented by the mapping is the base hair color of the virtual pet, the target appearance feature is a part of the virtual pet that differs from the base hair color.

Optionally, the target appearance feature is a colorpoint block of the base hair color of the virtual pet, a pattern block, a mitted block, or the like. This embodiment of this application does not limited this.

Optionally, the target appearance feature is distributed in the face, back, chest, legs, tail, limbs and other areas of the virtual pet. This embodiment of this application does not limited this.

Optionally, the target appearance features of different virtual pets may be the same or different.

In one possible implementation, in order to make the appearance features of the virtual pet closer to the animal in the real world, the target appearance feature of the virtual pet may be summarized on the basis of the hair nature of the corresponding animal in the real world. For example, the target appearance feature of the cat can be concluded by analyzing the hair shapes of 15 different kinds of cats, including solid color cats, blue cats, orange cats, leopard cats, civet cats, shorthair cats, and garfield cats. Refer to Table I for details, where the hair shapes of the solid color cats are listed. According to Table I, it can be seen that the target appearance features of the cats may be the colorpoint and the pattern. The colorpoint is mainly distributed on the face, ears, body, chest, and tail of the cat, and may be round dots or flakes. The pattern is mainly distributed on the body or face of the cat, and may be a fishbone pattern, a classical spot pattern, a dotted pattern, a fine stripe pattern, and the like. From this, it can be seen that the target appearance feature of the virtual pet cat may be the colorpoint block of the base hair color, such as round dots or flakes. The colorpoint color is mainly distributed on the face, ears, body, chest, and tail of the virtual pet cat. The target appearance feature may also be the pattern block of the base hair color, such as the fish bone pattern and the dotted pattern. The pattern block may be distributed on the face, back, chest, and other parts of the virtual pet cat. The target appearance feature may also be the mitted block of the base hair color, for example, a high mitted block and a low mitted block. The mitted block is mainly distributed on the four limbs of the virtual pet cat.

appearance editing interface for a virtual pet through an editing control, to adjust the type, color, shape, size, and the like of the target appearance feature.

Optionally, the editing control is a button control, a slider control, a palette control, or the like. This embodiment of this application does not limit this.

Figures 5, 6:
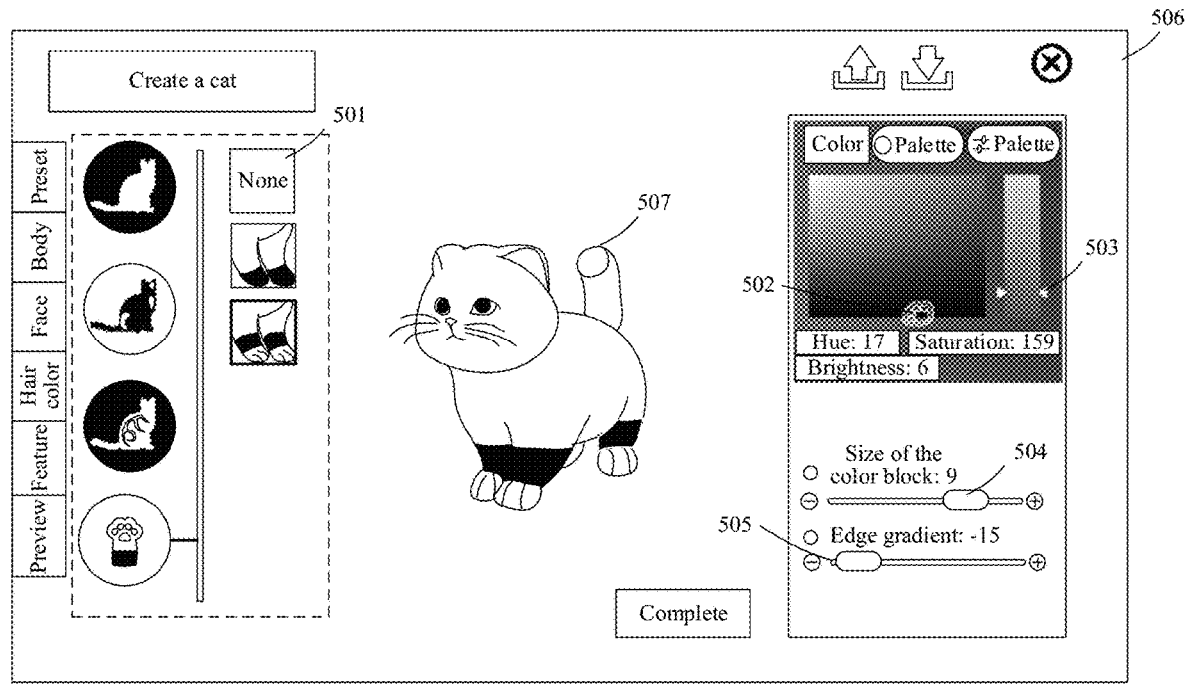
FIG. 5 shows a schematic diagram of an interface of an appearance editing method for a virtual pet according to one exemplary embodiment of this application.
FIG. 6 shows a schematic diagram of overlaying a mapping with a target matte mapping according to one exemplary embodiment of this application.

For example, as shown in FIG. 5, in a virtual pet editing interface 506, the type of the target appearance feature may be selected through a button control 501; the color of the target appearance feature may be selected through a palette control 502; the brightness and saturation of the color of the target appearance feature may be adjusted through a color slider control 503; the size of the target appearance feature may be adjusted through a color block slider control 504; and a gradient effect of the target appearance feature may be adjusted through an edge gradient slider control 505.

In this embodiment of this application, the target matte mapping represents the target appearance feature of the virtual pet.

Optionally, the target matte mapping is a mask mapping, a matte mapping, or the like. This embodiment of this application does not limit this.

Optionally, there is one or more target matte mappings. This embodiment of this application does not limit this.

Step 430. The terminal overlays the mapping with at least one layer of target matte mapping to obtain a target mapping, target matte mappings at different levels corresponding to different target appearance features.

In this embodiment of this application, one layer of target mapping is divided into multiple layers, that is, the target mapping is formed by overlaying the mapping with at least one layer of target matte mapping. Due to the fact that the target matte mappings at different levels correspond to different types of target appearance features, the user can overlay different target matte mappings on the mapping according to his preferences to form different target mappings, thereby forming virtual pets with different appearance features.

Optionally, in a case that there are multiple layers of target matte mappings, there is a hierarchy between the multiple

TABLE I

| Variety | Hair color | | Colorpoint | | | | | Pattern | |
|---|---|---|---|---|---|---|---|---|---|
| | The base color is all over the body | Face (excluding the ears) | Ears | Body (back + thighs + hip + belly) | Chest | Feet | Tail | Body (back/chest/legs/tail) | Face |
| Solid color cat | Black | Herringbone | Two ears | Back | Scarf | High mitted | All | Fishbone pattern | M stripes |
| | White | Triangular | Single ear | Round dot | | Low mitted | Sectional | Classical spot | 川-shaped pattern |
| | Yellow | Fine line pattern | | Flake | | | | Dotted pattern | Flame pattern |
| | Gray | Round cake | | | | | | Fine stripe pattern (shaded) | |

In one possible implementation, the user performs the editing operation on the target appearance feature in the appearance editing interface for a virtual pet, and the terminal generates the target matte mapping corresponding to the edited target appearance feature.

The editing operation performed on the target appearance feature refers to an operation performed by the user in the layers of target matte mappings, which means there is a sequential order of the overlaying of the different target matte mappings. Optionally, the target matte mapping with a lower level is first overlaid, while the target matte mapping with a higher level is then overlaid. Or, the target matte mapping with a higher level is first overlaid, while the target matte mapping with a lower level is then overlaid.

Optionally, the multiple target matte mappings can be overlaid with one mapping. The target matte mappings at different levels correspond to different target appearance features, and the target matte mappings at the same level correspond to the same target appearance feature. There may be different types of the same target appearance feature, so that the same target appearance feature corresponds to different target matte mappings. For example, if the target appearance feature is a pattern, including the fishbone pattern, the classical spot pattern, the dotted pattern, the fine stripe pattern, or the like, patterns with different shapes correspond to different target matte mappings.

Optionally, the user may perform the corresponding editing operations on the target matte mappings at different levels, and the target matte mappings at different levels do not affect each other.

For example, as shown in FIG. 6, a virtual pet cat is taken as an example. A target mapping (not shown) is obtained by overlaying a mapping 601, a first target matte mapping 602, a second target matte mapping 603, and a third target matte mapping 604. An appearance feature represented by the mapping 601 is a base hair color; an appearance feature represented by the first target matte mapping 602 is a colorpoint block; an appearance feature represented by the second target matte mapping 603 is a pattern block; and an appearance feature represented by the third target matte mapping 604 is a mitted block.

Step 440. The terminal applies the target mapping to a three-dimensional model of the virtual pet.

Applying different target mappings to the three-dimensional model of the virtual pet can obtain virtual pets with different appearance features.

For example, as shown in FIG. 6, the terminal applies the target mapping formed by overlaying the mapping 601, the first target matte mapping 602, the second target matte mapping 603, and the third target matte mapping 604 to the three-dimensional model of a virtual pet cat 605.

In conclusion, in this embodiment of this application, the mapping represents the appearance feature of the virtual pet; the target matte mapping represents the target appearance feature; the target appearance feature is an appearance feature other than the appearance feature represented by the mapping; and overlaying the mapping with different layers of the target matte mapping generates different target mappings that are applied to virtual pet models, thereby generating virtual pets with different appearance features. A target mapping is formed by overlaying a mapping with target matte mappings at different levels, so that adjusting the target matte mapping can generate different target mappings. On the one hand, a matching mapping is produced for one virtual pet. On the other hand, various virtual pets with different appearance features can be generated by using a limited number of art resources, thereby increasing the degree of freedom of editing an appearance of a virtual pet and enriching appearance features of the virtual pet.

Figure 7:
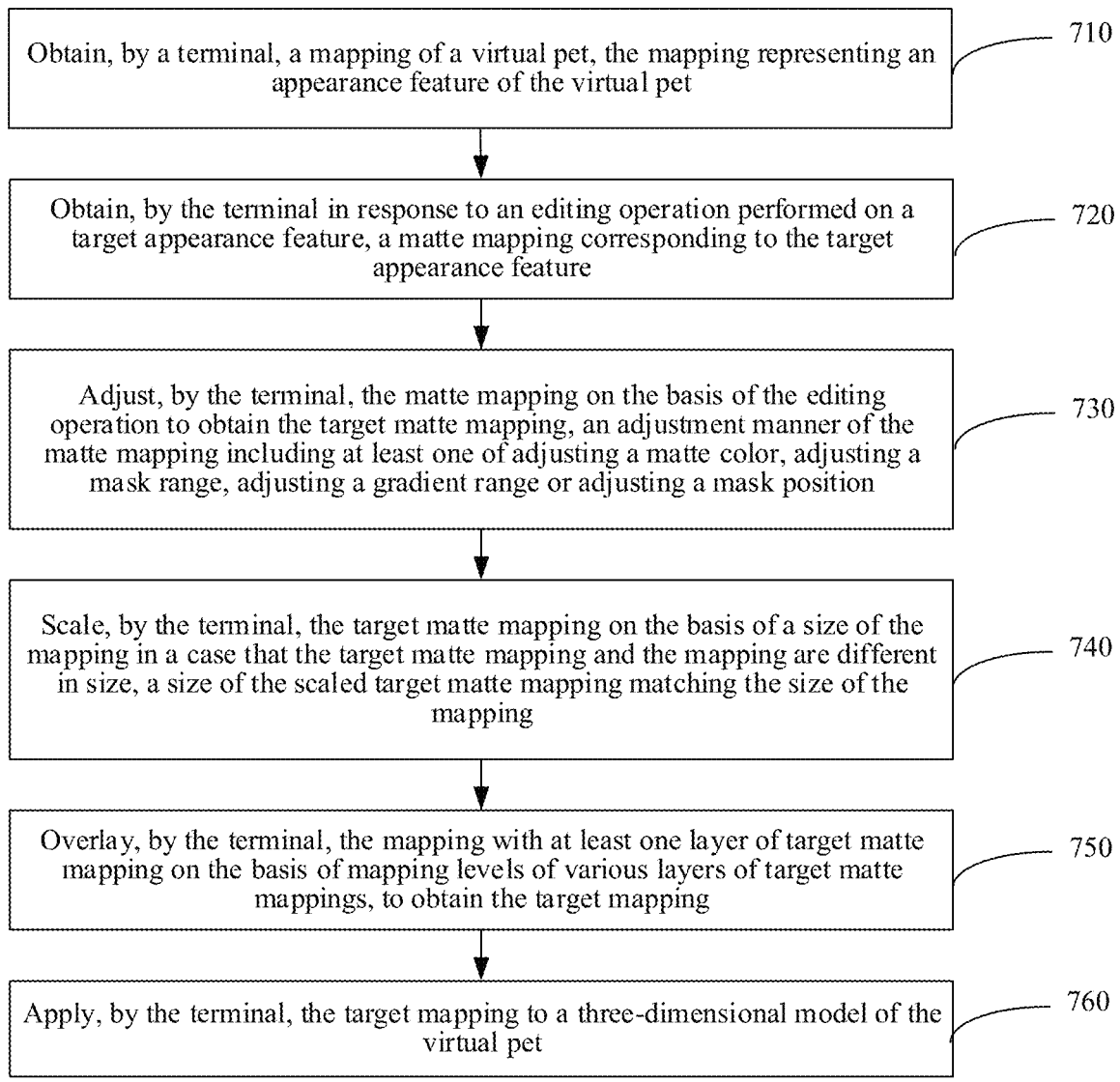
FIG. 7 shows a flowchart of an appearance editing method for a virtual pet according to another exemplary embodiment of this application.

In this embodiment of this application, a matte color, a mask range, a gradient range, and a mask position of a matte mapping are adjusted by editing operations, thereby achieving different types of target matte mappings and enriching the appearance features of the virtual pet. In addition, since the target matte mapping and the mapping are different in size, before the target mapping is obtained, the size of the target matte mapping needs to be adjusted to match the mapping. Referring to FIG. 7, a flowchart of an appearance editing method for a virtual pet according to another exemplary embodiment of this application is shown.

Step 710. A terminal obtains a mapping of a virtual pet, the mapping representing an appearance feature of the virtual pet.

Step 710 is the same as step 410. This embodiment of this application does not limit this.

Step 720. The terminal obtains, in response to an editing operation performed on a target appearance feature, a matte mapping corresponding to the target appearance feature.

When the user performs the editing operation on the target appearance feature in an appearance editing interface for a virtual pet, the terminal obtains the matte mapping corresponding to the target appearance feature. The matte mapping refers to a matte mapping corresponding to the current target appearance feature.

In one possible implementation, when the terminal first displays the appearance editing interface for a virtual pet, the user first edits the target appearance feature in the appearance editing interface, and the terminal obtains the matte mapping corresponding to the target appearance feature that has not yet been edited.

In another possible implementation, when the user has completed the editing operation on the target appearance feature and exits the application midway, the terminal will automatically save an editing status of the target appearance feature and a corresponding matte mapping before exiting the application. When the terminal enters the application again, the user continues the editing operation on the basis of the target appearance feature at the last time of exiting the game, and the terminal obtains the matte mapping corresponding to the target appearance feature edited at the last time of exiting the game.

Step 730. The terminal adjusts the matte mapping on the basis of the editing operation to obtain the target matte mapping, an adjustment manner of the matte mapping including at least one of adjusting a matte color, adjusting a mask range, adjusting a gradient range or adjusting a mask position.

In this embodiment of this application, the matte mapping includes a mask area and a non-mask area. In a lower layer of the matte mapping, a mapping content below the mask area is blocked, while a mapping content below the non-mask area is not blocked and can be observed through the target matte mapping. Optionally, the mask area is a non-transparent area, while the non-mask area is a transparent area.

In one possible implementation, the terminal obtains the target matte mapping by adjusting the color of the mask area of the matte mapping. The user selects a color in the appearance editing interface for a virtual pet through an editing control, and adjusts the color of the target appearance feature. The terminal adjusts the color of the matte mapping on the basis of the editing operation, thereby obtaining the target matte mapping.

Optionally, the terminal determines the hue selected by the user through a palette control, which is the type of the color, such as red, white, and orange, thereby adjusting the color of the matte mapping to obtain the target matte mapping.

Optionally, the terminal determines the brightness and saturation of the color adjusted by the user through a slider control, which is the shade of the color, such as bright red, deep red, and light red, thereby adjusting the color of the matte mapping to obtain the target matte mapping.

For example, as shown in FIG. 5, the target appearance feature being the mitted block is taken as an example. The user selects a hue of the mitted block through the palette control 502, and selects a saturation and brightness of the mitted block through the color slider control 503. The terminal adjusts the matte mapping on the basis of the editing operation to obtain the target matte mapping.

In one possible implementation, the terminal obtains the target matte mapping by adjusting the range of the mask area of the matte mapping. The user adjusts the size of the target appearance feature in the appearance editing interface for a virtual pet through an editing control. The terminal adjusts the mask range of the matte mapping on the basis of the editing operation, thereby obtaining the target matte mapping.

For example, as shown in FIG. 5, the target appearance feature being the mitted block is taken as an example. The user adjusts a size of the mitted block through the color block slider control 504. The terminal adjusts the matte mapping on the basis of the editing operation to obtain the target matte mapping.

In one possible implementation, the terminal obtains the target matte mapping by adjusting the gradient range of the mask area of the matte mapping. The user adjusts the edge gradient of the target appearance feature in the appearance editing interface for a virtual pet through an editing control. The terminal adjusts the gradient range of the matte mapping on the basis of the editing operation, thereby obtaining the target matte mapping.

For example, as shown in FIG. 5, the target appearance feature being the mitted block is taken as an example. The user adjusts an edge gradient effect of the mitted block through the edge gradient slider control 505. The terminal adjusts the matte mapping on the basis of the editing operation to obtain the target matte mapping.

In one possible implementation, the terminal obtains the target matte mapping by adjusting the position of the mask area of the matte mapping. The user adjusts the position of the target appearance feature in the appearance editing interface for a virtual pet through an editing control. The terminal adjusts the mask position of the matte mapping on the basis of the editing operation, thereby obtaining the target matte mapping.

Step 740. The terminal scales the target matte mapping on the basis of a size of the mapping in a case that the target matte mapping and the mapping are different in size, a size of the scaled target matte mapping matches the size of the mapping.

Optionally, the size of the target matte mapping matching the size of the mapping means that the size of the target matte mapping is the same as the size of the mapping. Optionally, the size of the target matte mapping matching the size of the mapping means that the size of the target matte mapping is the same as a size of an area in the mapping needing to be overlaid.

In one possible implementation, the size of the target matte mapping is the same as the size of the mapping. There is no need to adjust the size of the target matte mapping before the mapping is overlaid by the target matte mapping.

In another possible implementation, the size of the target matte mapping is different from the size of the mapping. Before the mapping is overlaid by the target matte mapping, the terminal automatically adjusts the size of the target matte mapping to match the mapping.

Step 750. The terminal overlays the mapping with at least one layer of target matte mapping on the basis of mapping levels of various layers of target matte mappings, to obtain the target mapping.

In one possible implementation, there is a mapping hierarchical relationship between the various layers of the target mask mapping, which means that the various layers of target matte mappings need to be overlaid according to a certain order. A level order of the mapping remains fixed, while all other layers of target matte mappings are overlaid in sequence on the mapping to form the target mapping.

In one possible implementation, the target matte mapping is a colorpoint matte mapping, a pattern matte mapping, a mitted matte mapping, or the like. This embodiment of this application does not limit this.

The colorpoint matte mapping represents a colorpoint block different from the base hair color of the virtual pet.

Optionally, the color block is dotted, block-shaped, flaky, or the like. This embodiment of this application does not limit this.

Figure 8:
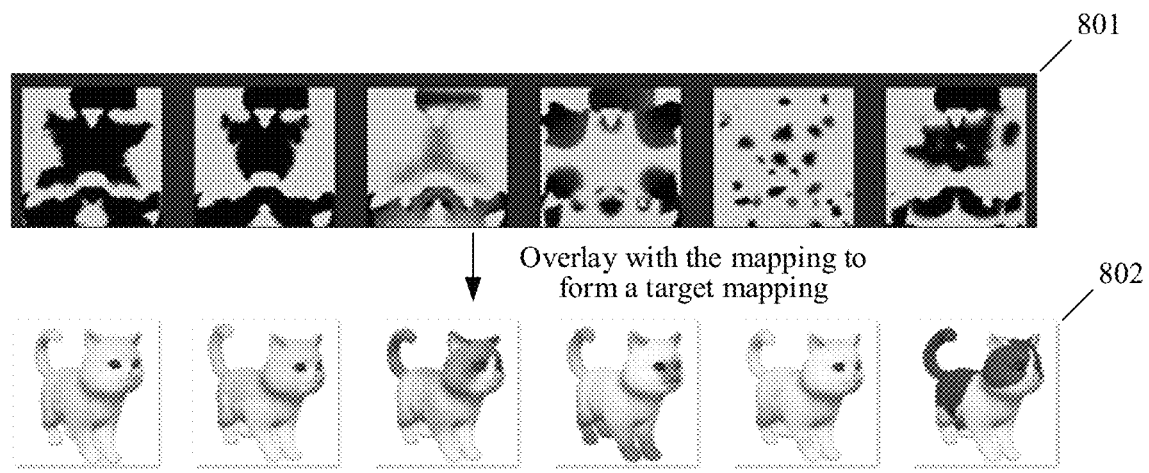
FIG. 8 shows a schematic diagram of a colorpoint matte mapping according to one exemplary embodiment of this application.

For example, as shown in FIG. 8, effects are achieved by overlaying different types of colorpoint matte mappings 801 on the mapping to form a target mapping (not shown), and applying the target mapping to virtual pet cats 802.

The pattern matte mapping represents a pattern block different from the base hair color of the virtual pet.

Optionally, the pattern block is mottled, striped, or the like. This embodiment of this application does not limit this.

Figure 9:
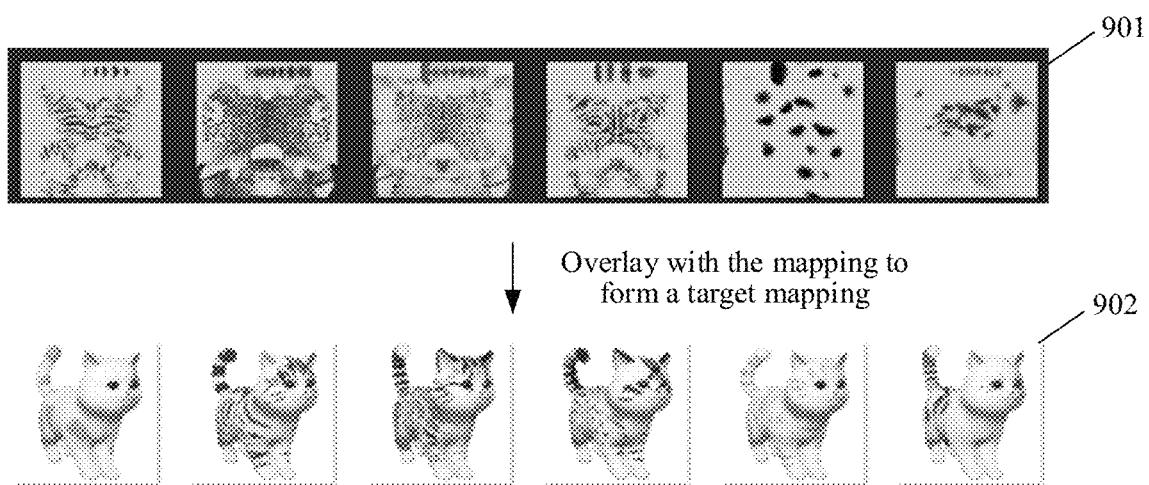
FIG. 9 shows a schematic diagram of a pattern matte mapping according to one exemplary embodiment of this application.

For example, as shown in FIG. 9, effects are achieved by overlaying different types of pattern matte mappings 901 on the mapping to form a target mapping (not shown), and applying the target mapping to virtual pet cats 902.

The mitted matte mapping represents a foot color block or hand color block on the base hair color.

Optionally, the color block is a block-shaped, dotted, flaky, or the like. This embodiment of this application does not limit this.

Figure 10:
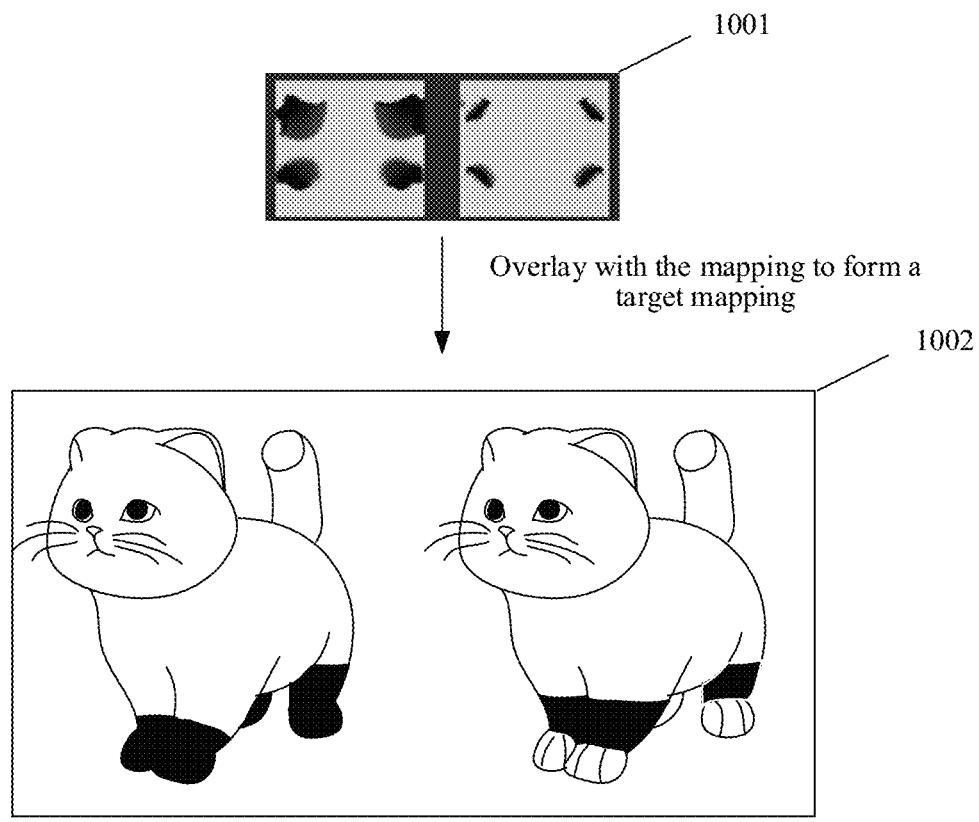
FIG. 10 shows a schematic diagram of a mitted matte mapping according to one exemplary embodiment of this application.

For example, as shown in FIG. 10, effects are achieved by overlaying different types of mitted matte mappings 1001 on the mapping to form a target mapping (not shown), and applying the target mapping to virtual pet cats 1002.

In one possible manner, a hierarchical relationship between the various target matte mappings. A mapping level of the mitted matte mapping is higher than a mapping level of the pattern matte mapping; and the mapping level of the pattern matte mapping is higher than a mapping level of the colorpoint matte mapping.

Figure 11:
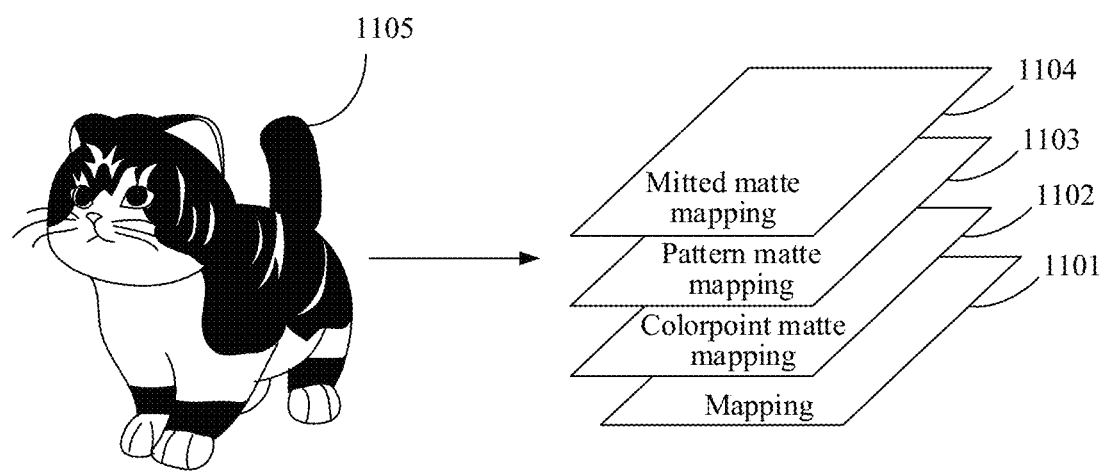
FIG. 11 shows a schematic diagram of overlaying target matte mappings at different levels according to one exemplary embodiment of this application.

For example, as shown in FIG. 11, a mapping 1101, a colorpoint matte mapping 1102, a pattern matte mapping 1103, and a mitted matte mapping 1104 are overlaid to form a target mapping, and the target mapping is applied to a virtual pet cat 1105. The hierarchical relationship of the aforementioned mappings is as follows: The first layer is the mapping 1101; the second layer is the colorpoint matte mapping 1102; the third layer is the pattern matte mapping 1103; and the fourth layer is the mitted matte mapping 1104. The focus here is to provide examples to describe the hierarchical relationship of the colorpoint matte mapping 1102, the pattern matte mapping 1103, and the mitted matte mapping 1104. Therefore, contents of the layers are not shown in the figure.

In addition, in this embodiment of this application, by arranging and combining different types of mappings and different types of target matte mappings at different levels, various virtual pets with different appearance features are generated through a limited number of art resources, thereby improving the degree of freedom of virtual pet appearance editing.

In one possible implementation, the target matte mappings at each layer are of the same type. For example, there are m types of mappings. The target matte mappings are on layer i. If a quantity of the target matte mappings at different levels is $M_1$ to $M_i$, a quantity N of generated target mappings is:

$N=m+(m\times M_1+m\times M_2 \ldots +m\times M_i)+(m\times M_1\times M_2+m\times M_1\times M_3 \ldots +m\times M_1\times M_i)+ \ldots m\times M_1\times M_2\times \ldots \times M_i.$ That is, N kinds of virtual pets with different appearance features can be presented, where m, i, $M_1$ to $M_i$, and N are all positive integers.

For example, there are four types of mappings. Target matte mappings include six types of colorpoint matte mappings, six types of pattern matte mappings, and two types of mitted matte mappings. By arranging and combining the above four types of mappings and 14 target matte mappings, a quantity of target mappings that can be obtained is: 4+4×6+4×6+4×2+4×6×2+4×6×2+4×6×6+4×6×6×2=588, which means that 588 virtual pets with different appearance features may be presented. In related art, if 588 virtual pets with different appearance features need to be presented, 588 kinds of matching mappings need to be made. In this embodiment of this application, the mappings can be achieved by the four types of mappings and the 14 types of target matte mappings, which reduces the number of art resources and enriches the appearance features of the virtual pet.

Step 760. The terminal applies the target mapping to a three-dimensional model of the virtual pet.

Step 760 is the same as step 440. This embodiment of this application does not repeat this.

In this embodiment of this application, different types of target matte mappings are achieved by adjusting the mask color, mask range, gradient range, and mask position of the matte mapping, thereby enriching the appearance features of the virtual pet. Various virtual pets with different appearance features are generated by using a limited number of art resources, thereby improving the degree of freedom of virtual pet appearance editing. In addition, the size of the target mapping is adjusted to match the mapping, to obtain the target mapping matching the three-dimensional model of the virtual pet.

Figure 12:
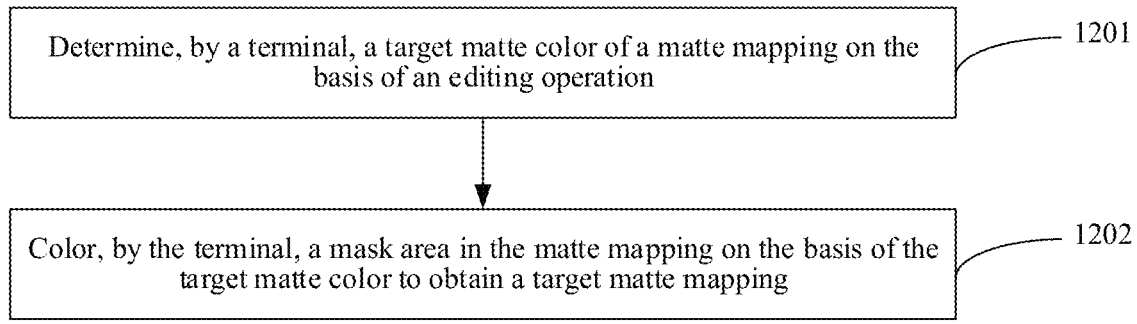
FIG. 12 shows a flowchart of a method for adjusting a matte color according to one exemplary embodiment of this application.

In this embodiment of this application, the matte mapping is divided into the mask area and the non-mask area, and a shape of the mask area corresponds to a shape of the target appearance feature of the virtual pet. In one possible implementation, the target matte mapping is obtained by coloring the mask area. Referring to FIG. 12, a flowchart of a method for adjusting a matte color according to one exemplary embodiment of this application is shown.

Step 1201. The terminal determines a target matte color of the matte mapping on the basis of the editing operation.

The user selects a color in the appearance editing interface for a virtual pet through an editing control. The terminal determines the target matte color on the basis of the color selected by the user.

Optionally, the editing operation is that the user selects the hue of the target matte by using the palette control, namely, the type of the color, such as black, white, and yellow. This embodiment of this application does not limit this.

Optionally, the editing operation is that the user adjusts the brightness and saturation of the target matte color by using the slider control, namely, the shade of the color, such as bright red, dark red, and light red. This embodiment of this application does not limit this.

For example, referring to FIG. 5, the target appearance feature being the mitted block is taken as an example. The user selects yellow as the hue of the target matte color by using the palette control 502, adjusts the saturation and brightness by using the color slider control 503, and adjusts the color to saffron yellow. The terminal determines that the target matte color is saffron yellow.

Step 1202. The terminal colors a mask area in the matte mapping on the basis of the target matte color to obtain the target matte mapping.

The terminal colors the mask area in the matte mapping on the basis of the determined target matte color to obtain the target matte mapping.

For example, in FIG. 5, the terminal determines that the target matte color is the saffron yellow on the basis of the editing operation performed by the user on the target appearance feature. The terminal colors the mask area of the matte mapping to saffron yellow, and then obtains the target matte mapping. At this time, in the appearance editing interface for a virtual pet, the mitted block of the virtual pet 507 appears saffron yellow.

The mask area of the matte mapping is colored, so that the diversity of the color of the target matte mapping is achieved, thereby enriching the appearance features of the virtual pet and improving the degree of freedom of virtual pet appearance editing.

Figure 13:
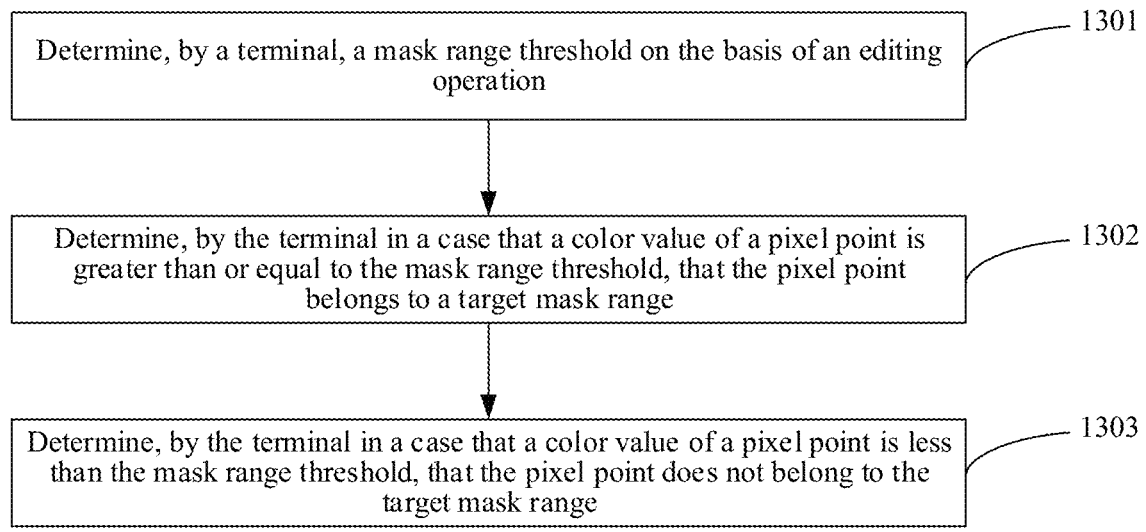
FIG. 13 shows a flowchart of a method for adjusting a mask range according to one exemplary embodiment of this application.

In another possible implementation, the shape and size of the target appearance feature are changed by adjusting the mask range. Referring to FIG. 13, a flowchart of a method for adjusting a mask range according to one exemplary embodiment of this application is shown.

Step 1301. The terminal determines a mask range threshold on the basis of the editing operation.

In this embodiment of this application, the mask area of the matte mapping is composed of several pixel points with different color values, and the color values of the pixel points decrease in sequence from a center to an edge of the mask area. The color values of the pixel points are used for controlling coloring degrees of the pixel points. The color value is positively correlated with the coloring degree of the pixel point. That is, the larger the color value, the higher the coloring degree of the pixel point, and the darker the color of the target appearance feature that the user sees in the appearance editing interface for a virtual pet; and the smaller the color value, the lower the coloring degree of the pixel point, and the lighter the color of the target appearance feature that the user sees in the appearance editing interface for a virtual pet. Therefore, in this embodiment of this application, the mask range threshold refers to a color value threshold of the pixel points.

In one possible implementation, the color value ranges from 1 to 0, and the color value of the center of the mask area is 1. The color value closer to the edge of the mask area is smaller, which means that the coloring degree of the pixel point in the center of the mask area is the largest, and the coloring degree of the pixel point at the edge is the smallest.

In one possible implementation, the user adjusts the size of the target appearance feature by using the editing control on the appearance editing interface for a virtual pet, and the terminal determines the mask range threshold on the basis of the size adjusted by the user. If the size of the target appearance feature varies, the corresponding mask range threshold also varies.

For example, as shown in FIG. 5, the target appearance feature being the mitted block is taken as an example. The user adjusts a size of the mitted block by using the color block slider control 504. Each time the user slides the color block slider control 504, the terminal adjusts the mask range threshold once, and the size of the mitted block presented varies. For example, if the size of the current mitted block is 9, the terminal determines a mask range threshold corresponding to the size. When the user moves the color block slider control 504 to the right to change the size of the mitted block to 15, the terminal continuously adjusts the corresponding mask range threshold on the basis of the editing operation of the user. The user can see that the size of the mitted block of the virtual pet cat gradually increases.

Step 1302. The terminal determines, in a case that the color value of a pixel point is greater than or equal to the mask range threshold, that the pixel point belongs to the target mask range.

The terminal determines the target mask range on the basis of the mask range threshold and the color values of the pixel points within a maximum mask range corresponding to the matte mapping. In one possible implementation, in a case that the color values of the pixel points are greater than or equal to the mask range threshold, an area formed by the pixel points greater than or equal to the mask range threshold is the target mask range. For example, the process of determining the target mask range is explained in conjunction with FIG. 14. It is determined that the color value of the pixel point within the maximum mask range corresponding to a matte mapping 1401 is 0.3, and the matte mapping 1401 is overlaid with a mapping 1405 to generate a target mapping applied to a virtual pet cat 1403. The user adjusts the size of the target appearance feature of the virtual pet cat 1403 by using the editing control. The terminal determines that the mask range threshold is 0.5 on the basis of the editing operation. At this time, the pixel points with the color values greater than or equal to 0.5 within the maximum mask range belong to the target mask range, thereby determining a target matte mapping 1402. The target matte mapping 1402 is overlaid on the mapping 1405 to generate a target mapping. The target mapping is applied to a virtual pet cat 1404.

Step 1303. The terminal determines, in a case that the color value of a pixel point is less than the mask range threshold, that the pixel point does not belong to the target mask range.

Figure 14:
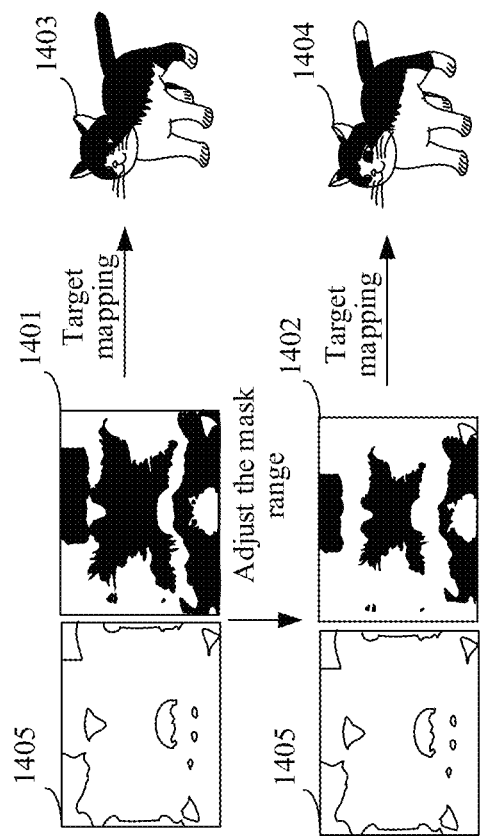
FIG. 14 shows a schematic diagram of a process for adjusting a mask range according to one exemplary embodiment of this application.

In another possible implementation, if the color value of a pixel point is less than the mask range threshold, the pixel point does not belong to the target mask range, which means that the pixel points with the color values less than the mask range threshold are not used for displaying the target appearance feature. For example, as shown in FIG. 14, the pixel points with the color values less than 0.5 in the matte mapping 1401 do not belong to the target mask range. In the appearance editing interface for a virtual pet, the user can see that the range of the target appearance feature of the virtual pet cat 1404 has decreased.

In this embodiment of this application, the relationship between the mask range threshold and the color values of the pixel points, the target mask range is determined, which achieves changes in the size of the target appearance feature of the virtual pet and enriches the appearance features of the virtual pet.

Figure 15:
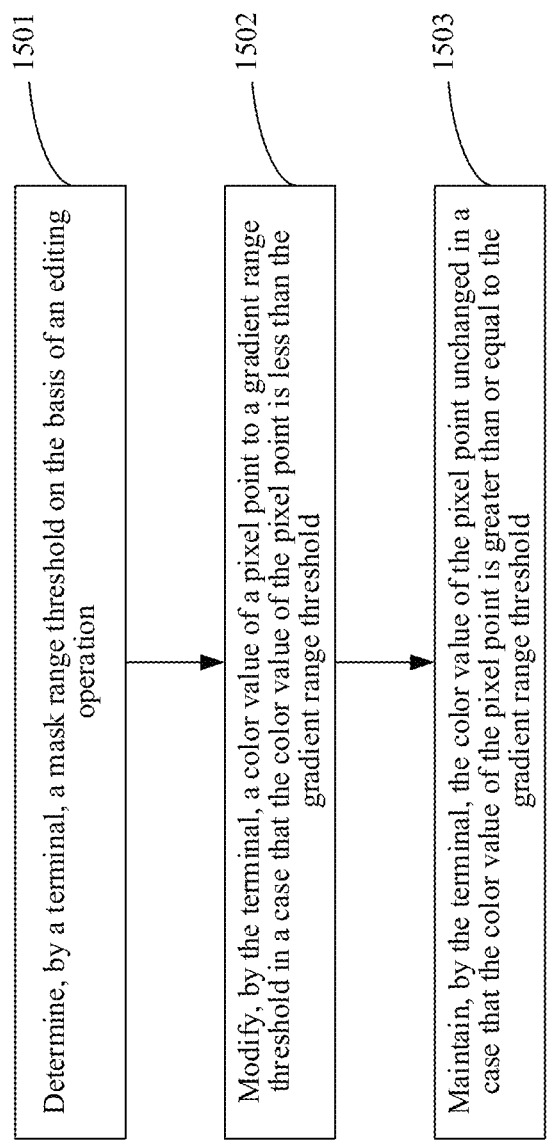
FIG. 15 shows a flowchart of a method for adjusting a gradient range according to one exemplary embodiment of this application.

In another possible implementation, an edge gradient effect of the target appearance feature is achieved by adjusting the mask gradient range. Referring to FIG. 15, a flowchart of a method for adjusting a gradient range according to one exemplary embodiment of this application.

Step 1501. The terminal determines a gradient range threshold on the basis of the editing operation.

In one possible implementation, the user adjusts the edge gradient of the target appearance feature by using the editing control on the appearance editing interface for a virtual pet, and the terminal determines the gradient range threshold on the basis of the editing operation. If the edge gradient effect of the target appearance feature varies, the corresponding gradient range threshold will also vary.

For example, as shown in FIG. 5, the target appearance feature being the mitted block is taken as an example. The user adjusts an edge gradient effect of the mitted block by using the edge gradient slider control 505. Each time the user slides the edge gradient slider control 505, the terminal adjusts the gradient range threshold once, and the edge gradient effect of the mitted block presented varies. For example, if the edge gradient of the current mitted block is −15, the terminal determines a gradient range threshold corresponding to the edge gradient. When the user moves the edge gradient slider control 505 to the right to enhance the edge gradient effect of the mitted block, the terminal continuously adjusts the corresponding gradient range threshold on the basis of the editing operation of the user. The user can see that the edge gradient effect of the mitted block of the virtual pet cat 507 is enhanced.

Step 1502. The terminal modifies the color value of the pixel point to be the gradient range threshold in a case that the color value of the pixel point is less than the gradient range threshold.

The terminal adjusts the gradient range within the mask range on the basis of the gradient range threshold and the color values of the pixel points within the mask range corresponding to the matte mapping. In one possible implementation, the terminal modifies the color value of the pixel point to be the gradient range threshold in a case that the color value of the pixel point within the mask range corresponding to the matte mapping is less than the gradient range threshold. Due to the hierarchical relationship between the target matte mappings at different levels, modifying the gradient range within the mask range is completed by adjusting the size of the mask range. Therefore, the terminal adjusts a gradient range area on the basis of the color values of the pixel points within the mask range corresponding to the matte mapping. For example, in combination with FIG. 16, the process of adjusting the gradient range of the mask range is explained. The terminal determines that the color value of the pixel point within the mask range corresponding to a matte mapping 1601 is 0.5, and the matte mapping 1601 is overlaid with a mapping 1605 to generate a target mapping applied to a virtual pet cat 1603. The user adjusts the edge gradient of the target appearance feature of the virtual pet cat 1603 by using the editing control. The terminal determines that the gradient range threshold is 0.7 on the basis of the editing operation. At this time, the color value of the pixel point within a range of 0.5 to 0.7 is adjusted to 0.7, that is, the coloring degree corresponding to the pixel point is changed, thereby determining a target matte mapping 1602. The target matte mapping 1602 is overlaid on the mapping 1605 to generate a target mapping. The target mapping is applied to a virtual pet cat 1604.

Step 1503: The terminal maintains the color value of the pixel point unchanged in a case that the color value of the pixel point is greater than or equal to the gradient range threshold.

Figure 16:
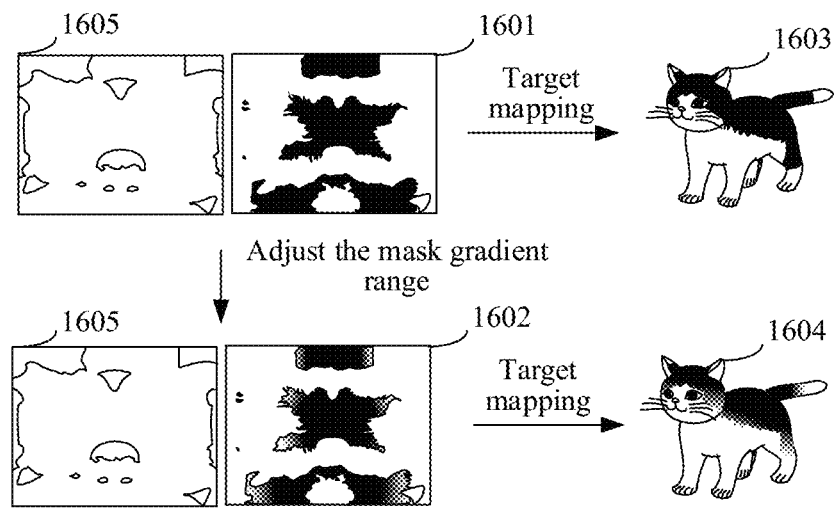
FIG. 16 shows a schematic diagram of a process for adjusting a gradient range according to one exemplary embodiment of this application.

In another possible implementation, if the color value of a pixel point is greater than or equal to the gradient range threshold, the color value of the pixel point remains unchanged, that is, the coloring degree corresponding to the pixel point remains unchanged. For example, as shown in FIG. 16, the color value of the pixel point greater than or equal to 0.7 remains unchanged. Therefore, in the appearance editing interface for a virtual pet, the user can see the edge gradient effect of the target appearance feature of the virtual pet cat 1604.

In this embodiment of this application, the relationship between the gradient range threshold and the color values of the pixel points, different effects of edge gradient of the target appearance feature of the virtual pet are achieved, and the appearance features of the virtual pet are enriched.

In addition, in one possible implementation, since some appearance features of the virtual pet only exist in fixed parts, such as the mitted block of the virtual pet cat, the positions of the mask and non-mask areas of some matte mappings are fixed.

In another possible implementation, the positions of the mask and non-mask areas of the matte mapping are not fixed. The terminal exchanges the positions of the mask area and the non-mask area of the matte mapping on the basis of the editing operation of the user to obtain the target matte mapping.

Figure 17:
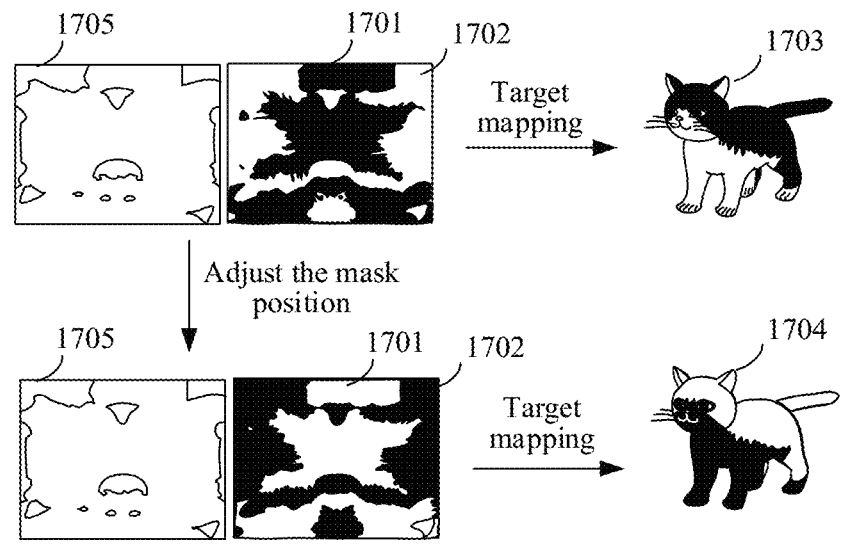
FIG. 17 shows a schematic diagram of a process for adjusting a mask position according to one exemplary embodiment of this application.

For example, as shown in FIG. 17, a mask area 1701 and a non-mask area 1702 of a matte mapping are shown. The mask area 1701 and the non-mask area 1702 are not exchanged. The matte mapping and a mapping 1705 are overlaid to generate a target mapping. The target mapping is applied to a virtual pet cat 1703. The user changes the position of the target appearance feature by using the editing control. On the basis of the editing operation, the terminal changes the mask area 1701 to a non-mask area and changes the non-mask area 1702 to a mask area, thereby determining a target matte mapping. The target matte mapping is overlaid on the mapping 1705 to generate a target mapping. The target mapping is applied to a virtual pet cat 1704. Compared with the virtual pet cat 1703, the position of the target appearance feature of the virtual pet cat 1704 has changed.

In this embodiment of this application, the positions of the mask and non-mask areas of the matte mapping, so that the appearance features of the virtual pet are enriched.

Figure 18:
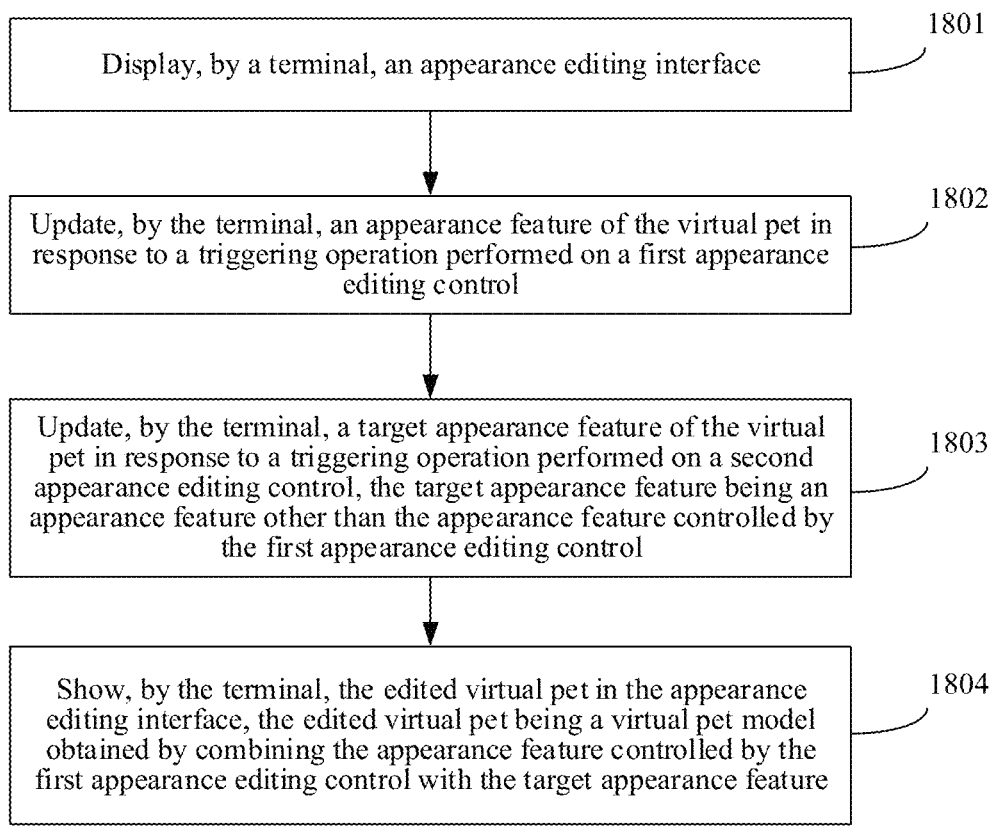
FIG. 18 shows a flowchart of an appearance editing method for a virtual pet according to still another exemplary embodiment of this application.

Referring to FIG. 18, a flowchart of an appearance editing method for a virtual pet according to another exemplary embodiment of this application is shown.

Step 1801. A terminal displays an appearance editing interface.

A user starts a game on the terminal, and the terminal displays the appearance editing interface of a virtual pet. The appearance editing interface includes the virtual pet, a first appearance editing control, and a second appearance editing control. The first appearance editing control is used for controlling an appearance feature of the virtual pet. The second appearance editing control is used for controlling a target appearance feature of the virtual pet. The target appearance feature is an appearance feature other than the appearance feature controlled by the first appearance editing control. For example, the first appearance editing control is used for controlling a basic appearance features of the virtual pet, and the second appearance editing control is used for controlling an appearance feature other than the basic appearance feature.

Figure 19:
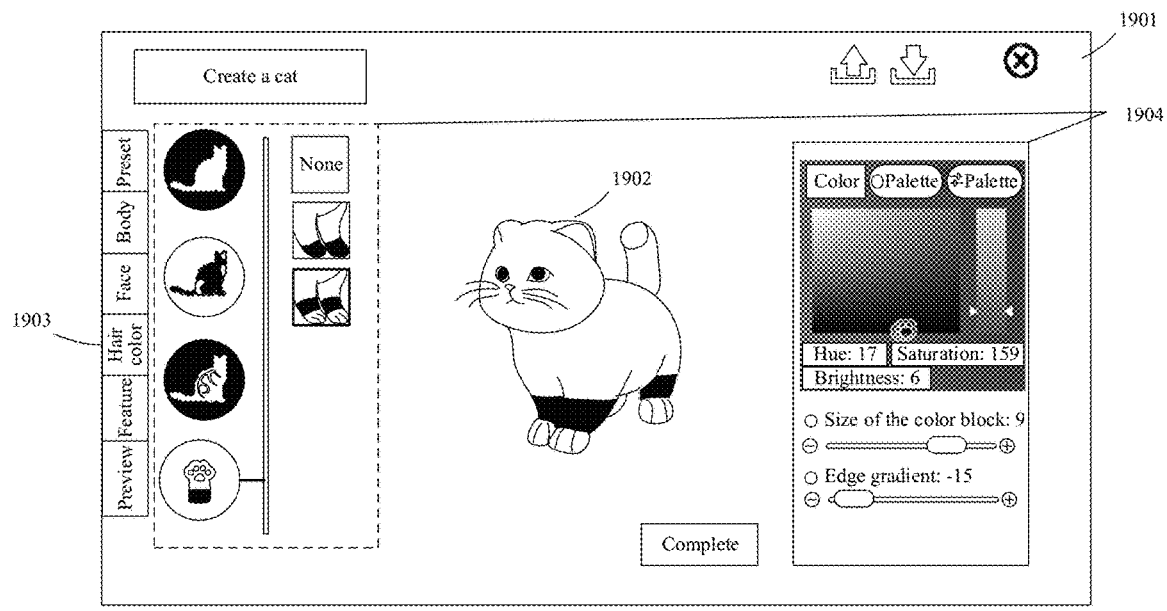
FIG. 19 shows a schematic diagram of a virtual pet editing interface according to one exemplary embodiment of this application.

For example, as shown in FIG. 19, a virtual pet appearance editing interface 1901 includes a virtual pet 1902, a first appearance editing control 1903, and a second appearance editing control 1904.

Step 1802. The terminal updates an appearance feature of the virtual pet in response to a triggering operation performed on the first appearance editing control.

Optionally, the first appearance editing control is used for controlling the basic appearance feature of the virtual pet, and the basic appearance feature refers to a base hair color of the virtual pet.

In one possible implementation, the first appearance editing control is a button control, a slider control, a palette control, or the like. This embodiment of this application does not limit this. The terminal adjusts the appearance feature of the virtual pet on the basis of an operation performed by a user on the button control, the slider control, and the palette control in the appearance editing interface, such as adjusting the base hair color of the virtual pet.

Step 1803: The terminal updates a target appearance feature of the virtual pet in response to a triggering operation performed on the second appearance editing control, the target appearance feature being an appearance feature other than the appearance feature controlled by the first appearance editing control.

Optionally, the first appearance editing control is used for controlling the basic appearance feature of the virtual pet. The basic appearance feature is the base hair color of the virtual pet, and the target appearance feature refers to a part of the virtual pet that differs from the base hair color. The terminal adjusts, on the basis of the operation performed by the user on the button control, the slider control, and the palette control in the appearance editing interface, the part of the virtual pet that differs from the base hair color.

In one possible implementation, the second appearance editing control is a button control, a slider control, a color palette control, or the like. This embodiment of this application does not limit this.

In one possible implementation, the target appearance feature is a part of the virtual pet that differs from the base hair color.

Optionally, the target appearance feature is a colorpoint block of hairs of the virtual pet, a pattern block, a mitted block, or the like. This embodiment of this application does not limited this.

Step 1804; The terminal shows the edited virtual pet in the appearance editing interface, the edited virtual pet being a virtual pet model obtained by combining the appearance feature controlled by the first appearance editing control with the target appearance feature controlled by the second appearance editing control.

The terminal shows the virtual pet model in the appearance editing interface on the basis of the virtual pet model obtained by combining the appearance feature controlled by the first appearance editing control with the target appearance feature controlled by the second appearance editing control. For example, as shown in FIG. 19, a virtual pet cat is taken as an example. If the terminal determines, on the basis of the operation performed by the user on the first appearance editing control 1903 that the base hair color of the virtual pet cat is white, the base hair color of the virtual pet cat 1902 shown by the terminal in the appearance editing interface 1901 for a virtual pet is white. The terminal determines a color, a size, and edge gradient of the mitted block of the virtual pet cat on the basis of the operation performed by the user on the second appearance editing control 1904. The mitted block of the virtual pet cat 1902 shown by the terminal in the appearance editing interface 1901 for a virtual pet is black, has a size of 9, and has edge gradient of −15. Based on the above appearance features, the terminal presents the virtual pet 1902 in the appearance editing interface for a virtual pet.

In summary, in this embodiment of this application, the virtual pet model is obtained by the appearance feature controlled by the first appearance editing control and the target appearance feature controlled by the second appearance editing control. The appearance feature controlled by the first appearance editing control and the target appearance feature controlled by the second appearance editing control are adjusted to generate virtual pets with different appearance features, thereby improving the degree of freedom of virtual pet appearance editing and enriching the appearance features of the virtual pet.

In addition, in this embodiment of this application, the terminal replaces a facial model, mappings, and the like of the virtual pet on the basis of the editing operation of the user, which enriches the facial features of the virtual pet and improves the degree of freedom of virtual pet appearance editing.

In one possible implementation, the terminal adjusts the face, nose, mouth, lips, and the like of the virtual pet on the basis of the editing operation of the user, to determine different kinds of virtual pets. In addition, changing the style of a nose mapping reflects differences between different varieties of the same virtual pet.

Figure 20:
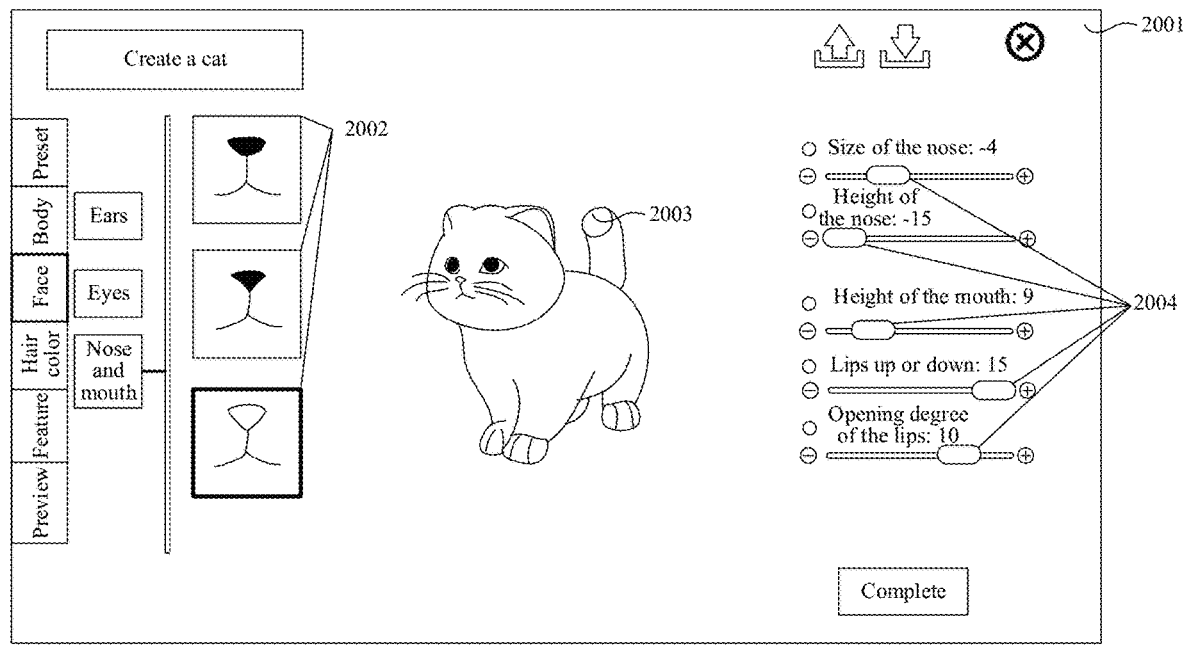
FIG. 20 shows a schematic diagram of an interface for adjusting the nose and mouth of a virtual pet according to one exemplary embodiment of this application.

For example, as shown in FIG. 20, a virtual pet cat is taken as an example. The user selects a nose and mouth mapping through button controls 2002 in an appearance editing interface 2001 for a virtual pet. The terminal changes the nose and mouth type of a virtual pet cat 2003 on the basis of the editing operation, thereby achieving different appearance features of the virtual pet cat 2003. In addition, the user performs a sliding operation on slider controls 2004 to adjust the size and height of the nose and the height of the mouse, make the lips up or down, and open or close the lips, and the terminal determines shapes of the nose, the mouth, and the lips of the virtual pet cat 2003 on the basis of the editing operation, to achieve different appearance features of the virtual pet cat 2003.

In one possible implementation, the terminal adjusts a virtual pet ear model and sizes of the ears on the basis of an editing operation performed by the user on the virtual pet ear model.

Figure 21:
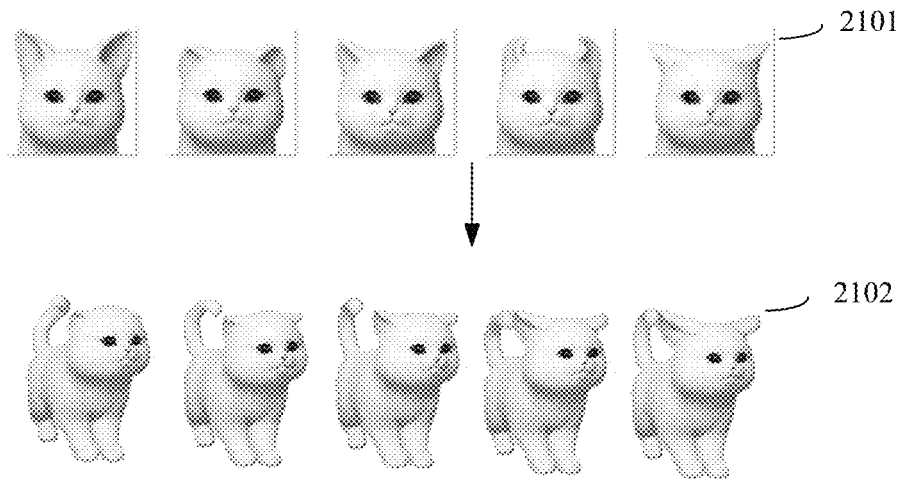
FIG. 21 shows a schematic diagram of a virtual pet ear model according to one exemplary embodiment of this application.

For example, as shown in FIG. 21, a virtual pet cat is taken as an example. The user selects different ear models 2101 according to the button controls, and the terminal replaces the ear models of the virtual pet on the basis of the editing operation, thereby presenting virtual pet cats 2102 with different appearance features.

In another possible implementation, the terminal adjusts sizes of the eyes and sizes and colors of the pupils on the basis of an editing operation of the user, to generate virtual pets with different appearance features. In addition, the rotation of the corners of the eyes can also be adjusted to present innocent drooping eyes, fierce lifting eyes, ordinary almond eyes, and other eye forms, thereby presenting different expressions of a virtual pet.

Figure 22:
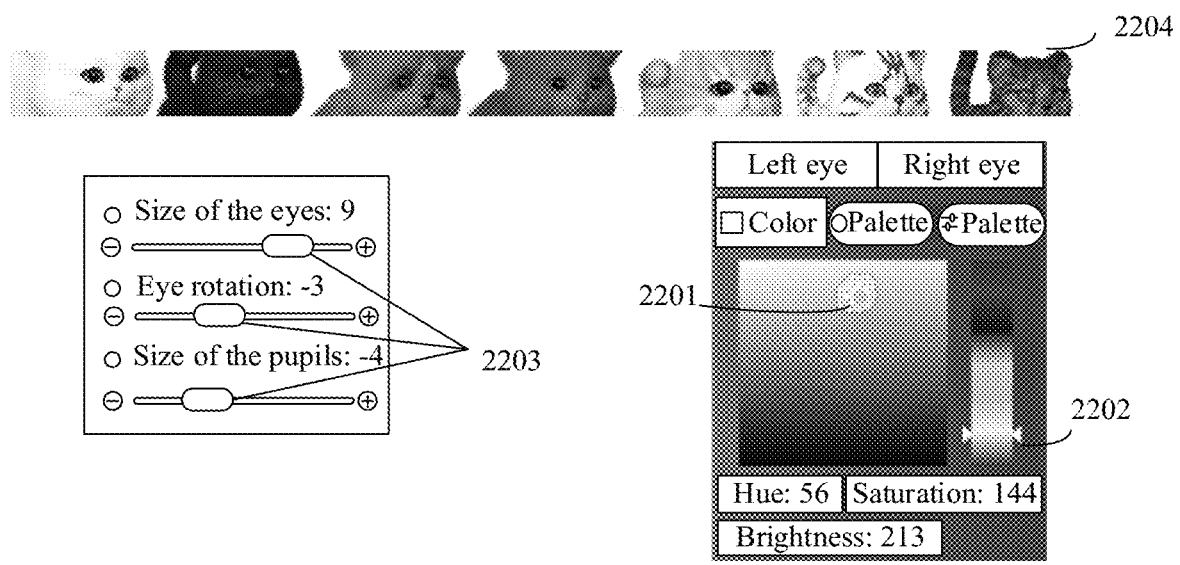
FIG. 22 shows a schematic diagram of adjusting the eyes of a virtual pet according to one exemplary embodiment of this application.

For example, as shown in FIG. 22, a virtual pet cat is taken as an example. The user selects the color of the pupils of the virtual pet cat by using a palette control 2201 and a color slider control 2202, and adjusts the sizes of the eyes of the virtual pet cat, eye rotation, and the sizes of the pupils by using slider controls 2203. The terminal determines the color and sizes of the pupils and the sizes and rotations of the eyes of the virtual pet cat, and finally presents virtual pet cats 2204 with different appearance features.

Optionally, the terminal adjusts a decorative applique mapping of the virtual pet on the basis of the editing operation of the user, to reflect different styles of the virtual pet.

Optionally, the decorative applique mapping includes patches, spots, strips, or the like. This embodiment of this application does not limit this.

Optionally, the decorative applique mapping is located in an eyebrow and eye area, a cheek area, a mouth or chin area, and the like. This embodiment of this application does not limit this.

Figure 23:
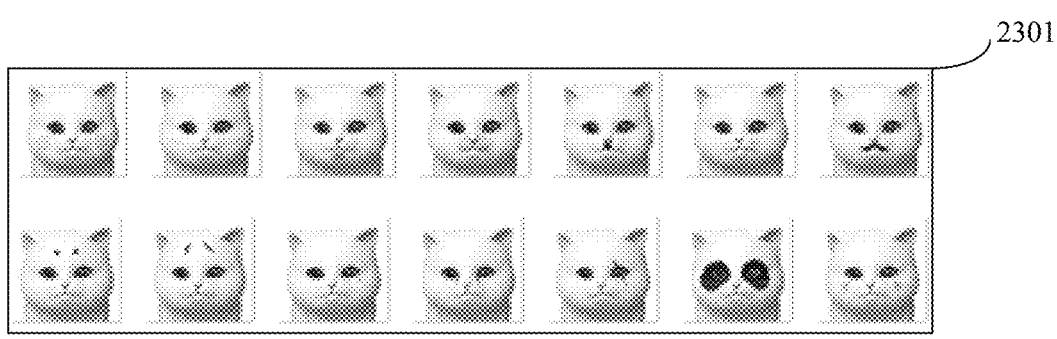
FIG. 23 shows a schematic diagram of a decorative applique mapping of a virtual pet according to one exemplary embodiment of this application.

For example, as shown in FIG. 23, a virtual pet cat is taken as an example. The user selects different decorative applique mappings 2301 by using a button control. The terminal adjusts the decorative applique mapping of the virtual pet on the basis of the editing operation, to generate virtual pet cats with different styles.

Figure 24:
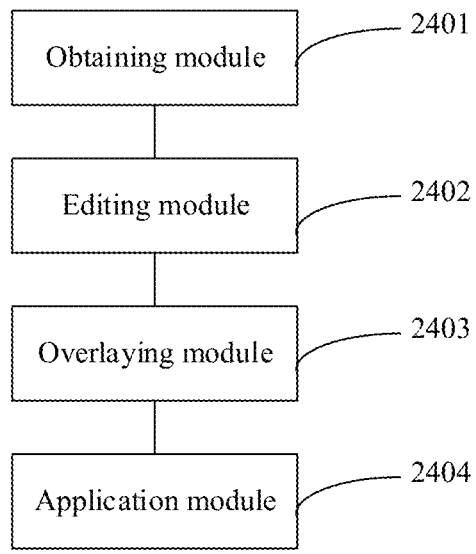
FIG. 24 shows a structural block diagram of an appearance editing apparatus for a virtual pet according to one exemplary embodiment of this application.

Referring to FIG. 24, a structural block diagram of an appearance editing apparatus for a virtual pet according to one exemplary embodiment of this application is shown. The apparatus includes:
- an obtaining module 2401, configured to obtain a mapping of a virtual pet, the mapping representing an appearance feature of the virtual pet;
- an editing module 2402, configured to generate, in response to an editing operation performed on a target appearance feature, a target matte mapping corresponding to the edited target appearance feature, the target appearance feature being an appearance feature other than the appearance feature represented by the mapping;
- an overlaying module 2403, configured to overlay the mapping with at least one layer of target matte mapping to obtain a target mapping, target matte mappings at different levels corresponding to different target appearance features; and
- an application module 2404, configured to apply the target mapping to a three-dimensional model of the virtual pet.

Optionally, the editing module 2402 includes:
- an obtaining unit, configured to obtain, in response to an editing operation performed on a target appearance feature, a matte mapping corresponding to the target appearance feature;
- an adjustment unit, configured to adjust the matte mapping on the basis of the editing operation to obtain the target matte mapping, an adjustment manner of the matte mapping including at least one of adjusting a matte color, adjusting a mask range, adjusting a gradient range or adjusting a mask position.

Optionally, the adjustment manner of the matte mapping is to adjust the matte color. The adjustment unit is configured to:
- determine a target matte color of the matte mapping on the basis of the editing operation; and
- color a mask area in the matte mapping on the basis of the target matte color to obtain the target matte mapping.

Optionally, the adjustment manner of the matte mapping is to adjust the mask range. The adjustment unit includes:
- a first determining subunit, configured to determine a mask range threshold on the basis of the editing operation;
- a second determining subunit, configured to determine a target mask range on the basis of the mask range threshold and color values of pixel points, and obtain the target matte mapping, the mask range of the target matte mapping being the target mask range, the pixel points referring to pixel points within the maximum mask range corresponding to the matte mapping, and the color values of the pixel points being used for controlling coloring degrees of the pixel points.

Optionally, the second determining subunit is configured to:
- determine, in a case that the color value of a pixel point is greater than or equal to the mask range threshold, that the pixel point belong to the target mask range; and determine, in a case that the color value of a pixel point is less than the mask range threshold, that the pixel point does not belong to the target mask range.

Optionally, the adjustment manner of the matte mapping is to adjust the gradient range. The adjustment unit includes:
a third determining subunit, configured to determine a gradient range threshold on the basis of the editing operation; and
an adjustment subunit, configured to adjust, by the terminal, a gradient range within the mask range on the basis of the gradient range threshold and color values of pixel points, and obtain the target matte mapping, the pixel points referring to pixel points within the mask range corresponding to the matte mapping, and the color values of the pixel points being used for controlling coloring degrees of the pixel points.

Optionally, the adjustment subunit is configured to:
modify the color value of the pixel point to be the gradient range threshold in a case that the color value of the pixel point is less than the gradient range threshold; and
maintain the color value of the pixel point unchanged in a case that the color value of the pixel point is greater than or equal to the gradient range threshold.

Optionally, the adjustment manner of the matte mapping is to adjust the mask position. The adjustment unit is configured to:
exchange a mask area and a non-mask area in the matte mapping on the basis of the editing operation to obtain the target matte mapping.

Optionally, the overlaying module 2403 is configured to:
overlay the mapping with at least one layer of target matte mapping on the basis of mapping levels of various layers of target matte mappings, to obtain the target mapping.

Optionally, the mapping represents a base hair color of the virtual pet;
the at least one layer of target matte mapping includes at least one of a colorpoint matte mapping, a pattern matte mapping, or a mitted matte mapping;
the colorpoint matte mapping represents a colorpoint block different from the base hair color;
the pattern matte mapping represents a pattern block different from the base hair color;
the mitted matte mapping represents a foot color block or hand color block different from the base hair color;
a mapping level of the mitted matte mapping is higher than a mapping level of the pattern matte mapping; and the mapping level of the pattern matte mapping is higher than a mapping level of the colorpoint matte mapping.

Optionally, the apparatus further includes a scaling module, configured to:
scale the target matte mapping on the basis of a size of the mapping in a case that the target matte mapping and the mapping are different in size, a size of the scaled target matte mapping matches the size of the mapping.

In conclusion, in this embodiment of this application, the mapping represents the appearance feature of the virtual pet; the target matte mapping represents the target appearance feature; the target appearance feature is an appearance feature other than the appearance feature represented by the mapping; and overlaying the mapping with different layers of the target matte mapping generates different target mappings that are applied to virtual pet models, thereby generating virtual pets with different appearance features. A target mapping is formed by overlaying a mapping with target matte mappings at different levels, so that adjusting the target matte mapping can generate different target mappings. On the one hand, a matching mapping is produced for one virtual pet. On the other hand, various virtual pets with different appearance features can be generated by using a limited number of art resources, thereby increasing the degree of freedom of editing an appearance of a virtual pet and enriching appearance features of the virtual pet.

Figure 25:
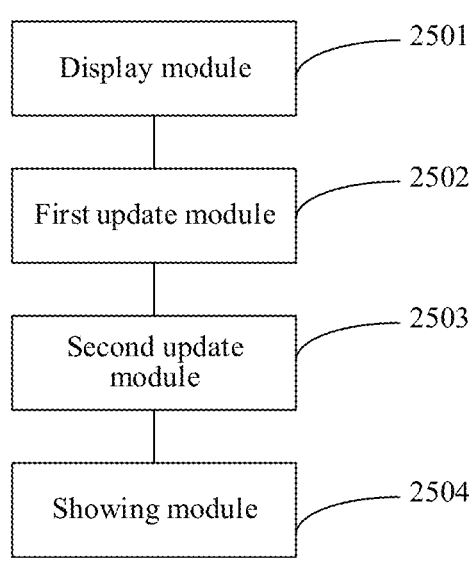
FIG. 25 shows a structural block diagram of an appearance editing apparatus for a virtual pet according to another exemplary embodiment of this application.

FIG. 25 is a structural block diagram of an appearance editing apparatus for a virtual pet according to another exemplary embodiment of this application. The apparatus includes:
a display module 2501, configured to display an appearance editing interface, the appearance editing interface including a first appearance editing control and a second appearance editing control;
a first update module 2502, configured to update an appearance feature of the virtual pet in response to a triggering operation performed on the first appearance editing control;
a second update module 2503, configured to update a target appearance feature of the virtual pet in response to a triggering operation performed on the second appearance editing control, the target appearance feature being an appearance feature other than the appearance feature controlled by the first appearance editing control; and
a showing module 2504, configured to: show the edited virtual pet in the appearance editing interface, the edited virtual pet being a virtual pet model obtained by combining the appearance feature controlled by the first appearance editing control with the target appearance feature.

In summary, in this embodiment of this application, the virtual pet model is obtained by the appearance feature controlled by the first appearance editing control and the target appearance feature controlled by the second appearance editing control. The appearance feature controlled by the first appearance editing control and the target appearance feature controlled by the second appearance editing control are adjusted to generate virtual pets with different appearance features, thereby improving the degree of freedom of virtual pet appearance editing and enriching the appearance features of the virtual pet.

Figure 26:
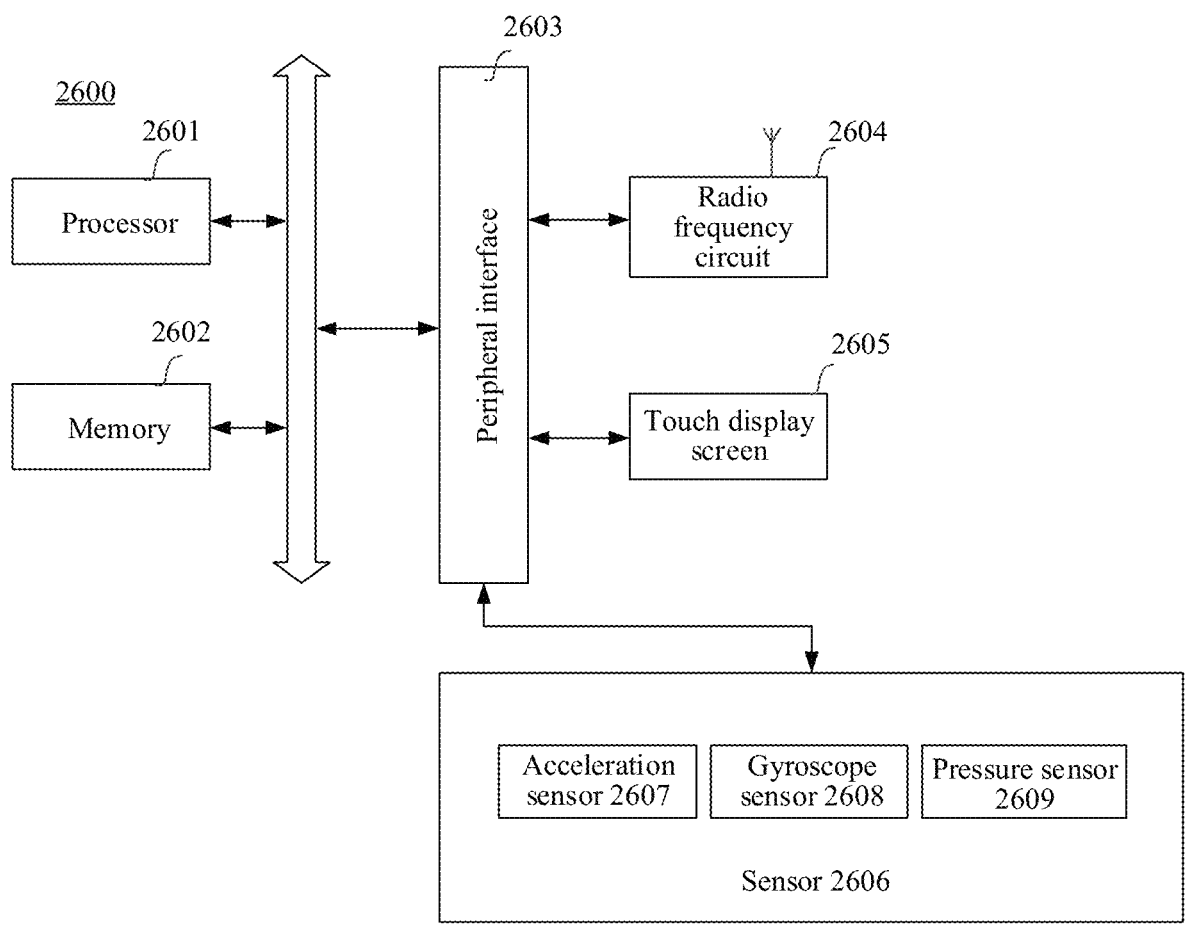
FIG. 26 shows a structural block diagram of a terminal according to an exemplary embodiment of this application.

FIG. 26 is a structural block diagram of a terminal 2600 according to an exemplary embodiment of this application. The terminal 2600 generally may be a portable mobile terminal, such as: a smartphone, a tablet computer, an ebook reader, a Moving Picture Experts Group Audio Layer III (MP3) player, and a Moving Picture Experts Group Audio Layer IV (MP4) player. The terminal 2600 may also be referred to as another name such as a user equipment and a portable terminal.

Generally, the terminal 2600 includes: a processor 2601 and a memory 2602.

The processor 2601 may include one or more processing cores, for example, a 4-core processor or an 8-core processor. The processor 2601 may be implemented in at least one hardware form of a digital signal processor (DSP), a field-programmable gate array (FPGA), and a programmable logic array (PLA). The processor 2601 may also include a main processor and a coprocessor. The main processor is a processor configured to process data in an awake state is also referred to as a central processing unit (CPU). The coprocessor is a low power consumption processor configured to process the data in a standby state. In some embodiments, the processor 2601 may be integrated with a graphics processing unit (GPU). The GPU is configured to render and draw content that needs to be displayed on a display screen. In some embodiments, the processor 2601 may further include an artificial intelligence (AI) processor. The AI processor is configured to process computing operations related to machine learning.

The memory 2602 may include one or more computer-readable storage media. The computer-readable storage media may be tangible and non-transitory. The memory 2602 may further include a high-speed random access memory and a nonvolatile memory, for example, one or more disk storage devices or flash storage devices. In some embodiments, a non-transitory computer-readable storage medium in the memory 2602 is configured to store at least one instruction, and the at least one instruction is used for being executed by the processor 2601 to implement the methods provided in the embodiments of this application.

In some embodiments, the terminal 2600 may further include: a peripheral interface 2603 and at least one peripheral device. Specifically, the peripheral device includes: a radio frequency circuit 2604 or a touch display screen 2605.

The peripheral interface 2603 may be configured to connect the at least one peripheral related to input/output (I/O) to the processor 2601 and the memory 2602. In some embodiments, the processor 2601, the memory 2602 and the peripheral interface 2603 are integrated on the same chip or circuit board. In some other embodiments, any one or two of the processor 2601, the memory 2602 and the peripheral device interface 2603 can be implemented on a single chip or circuit board. This embodiment will not limit this.

The radio frequency circuit 2604 is used for receiving and transmitting a radio frequency (RF) signal, also referred to as an electromagnetic signal. The RF circuit 2604 communicates with a communication network and other communication devices through the electromagnetic signal. The RF circuit 2604 converts an electric signal into an electromagnetic signal for transmission, or converts a received electromagnetic signal into an electric signal. Optionally, the RF circuit 2604 includes: an antenna system, an RF transceiver, one or more amplifiers, a tuner, an oscillator, a digital signal processor, a codec chip set, a subscriber identity module card, and the like. The RF circuit 2604 may communicate with another terminal by using at least one wireless communication protocol.

The touch display screen 2605 is used for displaying a UI. The UI may include a graph, text, an icon, a video, and any combination thereof. The touch display screen 2605 further has a capability of acquiring a touch signal on or above a surface of the touch display screen 2605. The touch signal may be inputted to the processor 2601 as a control signal for processing. The touch display screen 2605 is also used for providing virtual buttons and/or virtual keyboards, also referred to as soft buttons and/or soft keyboards. In some embodiments, there may be one touch display screen 2605 arranged on a front panel of the terminal 2600. In some other embodiments, there may be two touch display screens 2605 separately arranged on different surfaces of the terminal 2600 or are folded.

In some embodiments, the terminal 2600 further includes one or more sensors 2606. The one or more sensors 2606 include but are not limited to: an acceleration sensor 2607, a gyroscope sensor 2608, and a pressure sensor 2609.

The acceleration sensor 2607 may detect a magnitude of acceleration on three coordinate axes of a coordinate system established with the terminal 2600. For example, the acceleration sensor 2607 may be configured to detect components of gravity acceleration on the three coordinate axes. The processor 2601 may control, according to a gravity acceleration signal acquired by the acceleration sensor 2607, the touch display screen 2605 to display the UI in a landscape view or a portrait view. The acceleration sensor 2607 may be further configured to acquire motion data of a game or a user.

The gyroscope sensor 2608 may detect a body direction and a rotation angle of the terminal 2600. The gyroscope sensor 2608 may cooperate with the acceleration sensor 2607 to acquire a 3D action by the user on the terminal 2600. The processor 2601 may implement the following functions according to the data acquired by the gyroscope sensor 2608: motion sensing (such as changing the UI according to a tilt operation of the user), image stabilization at shooting, game control, and inertial navigation.

The pressure sensor 2609 may be arranged at a side frame of the terminal 2600 and/or a lower layer of the touch display screen 2605. When the pressure sensor 2609 is arranged at the side frame of the terminal 2600, a holding signal of the user on the terminal 2600 may be detected. Left and right hand recognition or a quick operation can be detected according to the holding signal. When the pressure sensor 2609 is arranged on the low layer of the touch display screen 2605, an operable control on the UI can be controlled according to a pressure operation performed by the user on the touch display screen 2605. The operable control includes at least one of a button control, a scroll-bar control, an icon control, and a menu control.

A person skilled in the art may understand that the structure shown in FIG. 26 constitutes no limitation on the terminal 2600, and the terminal may include more or fewer components than those shown in the figure, or some components may be combined, or a different component deployment may be used.

The embodiments of this application further provide a terminal, including a processor and a memory. The memory stores at least one instruction, at least one program, a code set, or an instruction set, and the at least one instruction, the at least one program, the code set, or the instruction set is loaded and executed by the processor to implement the following operations:

obtaining a mapping of a virtual pet, the mapping representing an appearance feature of the virtual pet;
  generating, in response to an editing operation performed on a target appearance feature, a target matte mapping corresponding to the edited target appearance feature, the target appearance feature being an appearance feature other than the appearance feature represented by the mapping;
  overlaying the mapping with at least one layer of target matte mapping to obtain a target mapping, target matte mappings at different levels corresponding to different target appearance features; and
  applying the target mapping to a three-dimensional model of the virtual pet.

Optionally, the at least one instruction, the at least one program, the code set, or the instruction set is loaded and executed by the processor to implement the following operations:

obtaining, in response to the editing operation, a matte mapping corresponding to the target appearance feature; and
  adjusting the matte mapping on the basis of the editing operation to obtain the target matte mapping, an adjustment manner of the matte mapping including at least one of adjusting a matte color, adjusting a mask range, adjusting a gradient range or adjusting a mask position.

Optionally, the adjustment manner of the matte mapping is to adjust the matte color. The at least one instruction, the at least one program, the code set, or the instruction set is loaded and executed by the processor to implement the following operations:

determining a target matte color of the matte mapping on the basis of the editing operation; and coloring a mask area in the matte mapping on the basis of the target matte color to obtain the target matte mapping.

Optionally, the adjustment manner of the matte mapping is to adjust the mask range. The at least one instruction, the at least one program, the code set, or the instruction set is loaded and executed by the processor to implement the following operations:

determining a mask range threshold on the basis of the editing operation; and determining a target mask range on the basis of the mask range threshold and color values of pixel points, and obtain the target matte mapping, the mask range of the target matte mapping being the target mask range, the pixel points referring to pixel points within the maximum mask range corresponding to the matte mapping, and the color values of the pixel points being used for controlling coloring degrees of the pixel points.

Optionally, the at least one instruction, the at least one program, the code set, or the instruction set is loaded and executed by the processor to implement the following operations:

determining, in a case that the color value of a pixel point is greater than or equal to the mask range threshold, that the pixel point belong to the target mask range; and determining, in a case that the color value of a pixel point is less than the mask range threshold, that the pixel point does not belong to the target mask range.

Optionally, the adjustment manner of the matte mapping is to adjust the gradient range. The at least one instruction, the at least one program, the code set, or the instruction set is loaded and executed by the processor to implement the following operations:

determining a gradient range threshold on the basis of the editing operation; and adjusting a gradient range within the mask range on the basis of the gradient range threshold and color values of pixel points, and obtaining the target matte mapping, the pixel points referring to pixel points within the mask range corresponding to the matte mapping, and the color values of the pixel points being used for controlling coloring degrees of the pixel points.

Optionally, the at least one instruction, the at least one program, the code set, or the instruction set is loaded and executed by the processor to implement the following operations:

modifying the color value of the pixel point to be the gradient range threshold in a case that the color value of the pixel point is less than the gradient range threshold; and maintaining the color value of the pixel point unchanged in a case that the color value of the pixel point is greater than or equal to the gradient range threshold.

Optionally, the adjustment manner of the matte mapping is to adjust the mask position. The at least one instruction, the at least one program, the code set, or the instruction set is loaded and executed by the processor to implement the following operation:

exchanging a mask area and a non-mask area in the matte mapping on the basis of the editing operation to obtain the target matte mapping.

Optionally, the at least one instruction, the at least one program, the code set, or the instruction set is loaded and executed by the processor to implement the following operation:

overlaying the mapping with at least one layer of target matte mapping on the basis of mapping levels of various layers of target matte mappings, to obtain the target mapping.

Optionally, the mapping represents a base hair color of the virtual pet;

the at least one layer of target matte mapping includes at least one of a colorpoint matte mapping, a pattern matte mapping, or a mitted matte mapping;

the colorpoint matte mapping represents a colorpoint block different from the base hair color;

the pattern matte mapping represents a pattern block different from the base hair color;

the mitted matte mapping represents a foot color block or hand color block different from the base hair color;

a mapping level of the mitted matte mapping is higher than a mapping level of the pattern matte mapping; and the mapping level of the pattern matte mapping is higher than a mapping level of the colorpoint matte mapping.

Optionally, the at least one instruction, the at least one program, the code set, or the instruction set is loaded and executed by the processor to implement the following operation:

scaling the target matte mapping on the basis of a size of the mapping in a case that the target matte mapping and the mapping are different in size, a size of the scaled target matte mapping matches the size of the mapping.

The embodiments of this application further provide a terminal, including a processor and a memory. The memory stores at least one instruction, at least one program, a code set, or an instruction set, and the at least one instruction, the at least one program, the code set, or the instruction set is loaded and executed by the processor to implement the following operations:

displaying an appearance editing interface, the appearance editing interface including a first appearance editing control and a second appearance editing control;

updating an appearance feature of the virtual pet in response to a triggering operation performed on the first appearance editing control;

updating a target appearance feature of the virtual pet in response to a triggering operation performed on the second appearance editing control, the target appearance feature being an appearance feature other than the appearance feature controlled by the first appearance editing control; and showing the edited virtual pet in the appearance editing interface, the edited virtual pet being a virtual pet model obtained by combining the appearance feature controlled by the first appearance editing control with the target appearance feature.

The embodiments of this application further provide a computer-readable storage medium. The computer-readable storage medium stores at least one instruction, and at least one instruction is loaded and executed by a processor to implement the appearance editing methods for a virtual pet in the various embodiments described above.

According to one aspect of this application, a computer program product or a computer program is provided. The computer program product or the computer program includes computer instructions stored in a computer-readable memory. A processor of a terminal reads the computer instructions from the computer-readable storage medium, and executes the computer instructions, so that the terminal implements the appearance editing methods for a virtual pet provided in the various optional implementations described above.

A person skilled in the art is to be aware that in the foregoing one or more examples, functions described in the embodiments of this application may be implemented by hardware, software, firmware, or any combination thereof. When implemented by using software, these functions can be stored in a computer-readable storage medium or can be transmitted as one or more instructions or code in a computer-readable storage medium. The computer-readable storage medium includes a computer storage medium and a communication medium. The communication medium includes any medium that enables a computer program to be transmitted from one place to another. The storage medium may be any available medium accessible to a general-purpose or a dedicated computer.

The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for editing an appearance of a virtual pet, the method being performed by a processor in a terminal, the method comprising:
    obtaining a first layer mapping of the virtual pet, the first layer mapping comprising a base appearance feature of the virtual pet;
    generating a target texture mapping corresponding to the a target appearance feature in response to an editing operation on the target appearance feature, wherein the target appearance feature is different than the base appearance of the virtual pet;
    obtaining a target texture mapping of the virtual pet by overlaying the first layer mapping of the virtual pet with at least one layer of target masked texture mapping, wherein each layer of the target masked texture mapping corresponds to a different target appearance feature;
    based on the target texture mapping and the first layer mapping being different in size, scaling the target texture mapping in accordance with a size of the first layer mapping such that a size of the scaled target texture mapping matches the size of the first layer mapping; and
    applying the target texture mapping to a preset three-dimensional model of the virtual pet.

2. The method according to claim 1, wherein generating the target texture mapping comprises:
    obtaining, in response to the editing operation, a texture mapping corresponding to the target appearance feature; and
    obtaining the target texture mapping by adjusting the texture mapping based on the editing operation, wherein the adjusting comprises at least one of adjusting a matte color, adjusting a mask range, adjusting a gradient range, or adjusting a mask position.

3. The method according to claim 2, wherein the adjusting comprises adjusting the matte color, and wherein obtaining the target texture mapping by adjusting comprises:
    determining a target matte color of the texture mapping based on the editing operation; and
    coloring a mask area in the texture mapping based on the target matte color to obtain the target texture mapping.

4. The method according to claim 2, wherein the adjusting comprises adjusting the mask range, and wherein obtaining the target texture mapping by adjusting comprises:
    determining a mask range threshold based on the editing operation;
    determining a target mask range based on the mask range threshold and color values of pixel points; and
    obtaining the target texture mapping, wherein the mask range of the target texture mapping is the target mask range, wherein the pixel points correspond to pixel points within a maximum mask range of the texture mapping, and wherein the color values of the pixel points control coloring degrees of the pixel points.

5. The method according to claim 4, wherein determining the target mask range comprises:
    based on a color value of a pixel point being greater than or equal to the mask range threshold, determining that the pixel point belongs to the target mask range; and
    based on the color value of the pixel point being less than the mask range threshold, determining that the pixel point does not belong to the target mask range.

6. The method according to claim 2, wherein the adjusting comprises adjusting the gradient range, and wherein obtaining the target texture mapping by adjusting comprises:
    determining a gradient range threshold based on the editing operation; and
    obtaining the target texture mapping by adjusting a gradient range within the mask range based on the gradient range threshold and color values of pixel points, wherein the pixel points correspond to pixel points within the mask range corresponding to the texture mapping, and wherein the color values of the pixel points control coloring degrees of the pixel points.

7. The method according to claim 6, wherein obtaining the target texture mapping by adjusting the gradient range within the mask range comprises:
    modifying a color value of a pixel point to the gradient range threshold when the color value of the pixel point is less than the gradient range threshold; and
    maintaining the color value of the pixel point when the color value of the pixel point is greater than or equal to the gradient range threshold.

8. The method according to claim 2, wherein the adjusting comprises adjusting the mask position, and wherein obtaining the target texture mapping by adjusting comprises:
    exchanging a mask area and a non-mask area in the texture mapping based on the editing operation to obtain the target texture mapping.

9. The method according to claim 1, wherein obtaining the target texture mapping of the virtual pet by overlaying the first layer mapping of the virtual pet comprises:
    obtaining target texture mappings by overlaying the first layer mapping with the at least one layer of the target masked texture mapping based on the target texture mappings at different levels, each level associated with a different target appearance feature.

10. The method according to claim 9, wherein the first layer mapping is a base hair color of the virtual pet;
    wherein the at least one layer of the target masked texture mapping comprises at least one of a colorpoint texture mapping, a pattern texture mapping, or a mitted texture mapping;
    wherein the colorpoint texture mapping is a colorpoint block different from the base hair color;

wherein the pattern texture mapping is a pattern block different from the base hair color;
wherein the mitted texture mapping is a foot color block or hand color block different from the base hair color;
wherein a mapping level of the mitted texture mapping is higher than a mapping level of the pattern texture mapping; and
wherein the mapping level of the pattern texture mapping is higher than a mapping level of the colorpoint texture mapping.

11. An apparatus for editing an appearance of a virtual pet, the apparatus comprising:
at least one memory configured to store computer program code; and
at least one processor configured to access the at least one memory and operate according to the computer program code, the computer program code comprising:
first obtaining code configured to cause the at least one processor to obtain a first layer mapping of the virtual pet, the first layer mapping comprising a base appearance of the virtual pet;
first generating code configured to cause the at least one processor to generate a target texture mapping corresponding to the a target appearance feature in response to an editing operation on the target appearance feature, wherein the target appearance feature is different than the base appearance of the virtual pet;
second obtaining code configured to cause the at least one processor to obtain a target texture mapping of the virtual pet by overlaying the first layer mapping of the virtual pet with at least one layer of the target masked texture mapping, wherein each layer of the target masked texture mapping corresponds to a different target appearance feature;
scaling code based configured to cause the at least one processor to, on the target texture mapping and the first layer mapping being different in size, scale the target texture mapping in accordance with a size of the first layer mapping such that a size of the scaled target texture mapping matches the size of the first layer mapping; and
first applying code configured to cause the at least one processor to apply the target texture mapping to a preset three-dimensional model of the virtual pet.

12. The apparatus of claim 11, the first generating code comprises:
third obtaining code configured to cause the at least one processor to obtain, in response to the editing operation, a texture mapping corresponding to the target appearance feature; and
fourth obtaining code configured to cause the at least one processor to obtain the target texture mapping by adjusting the texture mapping based on the editing operation, wherein the adjusting comprises at least one of adjusting a matte color, adjusting a mask range, adjusting a gradient range, or adjusting a mask position.

13. The apparatus of claim 12, wherein the adjusting comprises adjusting the matte color, and wherein the second obtaining code comprises:
first determining code configured to cause the at least one processor to determine a target matte color of the texture mapping based on the editing operation; and
first coloring code configured to cause the at least one processor to color a mask area in the texture mapping based on the target matte color to obtain the target texture mapping.

14. The apparatus of claim 12, wherein the adjusting comprises adjusting the mask range, and wherein the second obtaining code comprises:
second determining code configured to cause the at least one processor to determine a mask range threshold based on the editing operation;
third determining code configured to cause the at least one processor to determine a target mask range based on the mask range threshold and color values of pixel points; and
fifth obtaining code configured to cause the at least one processor to obtain the target texture mapping, wherein the mask range of the target texture mapping is the target mask range, wherein the pixel points correspond to pixel points within a maximum mask range of the texture mapping, and wherein the color values of the pixel points control coloring degrees of the pixel points.

15. The apparatus of claim 14, wherein the third determining code comprises:
based on a color value of a pixel point being greater than or equal to the mask range threshold, fourth determining code configured to cause the at least one processor to determine that the pixel point belongs to the target mask range; and
based on the color value of the pixel point being less than the mask range threshold, fifth determining code configured to cause the at least one processor to determine that the pixel point does not belong to the target mask range.

16. The apparatus of claim 12, wherein the adjusting comprises adjusting the gradient range, and wherein the second obtaining code comprises:
sixth determining code configured to cause the at least one processor to determine a gradient range threshold based on the editing operation; and
sixth obtaining code configured to cause the at least one processor to obtain the target texture mapping by adjusting a gradient range within the mask range based on the gradient range threshold and color values of pixel points, wherein the pixel points correspond to pixel points within the mask range corresponding to the texture mapping, and wherein the color values of the pixel points control coloring degrees of the pixel points.

17. The apparatus of claim 16, wherein the sixth obtaining code comprises:
modifying code configured to cause the at least one processor to modify a color value of a pixel point to the gradient range threshold when the color value of the pixel point is less than the gradient range threshold; and
maintaining code configured to cause the at least one processor to maintain the color value of the pixel point when the color value of the pixel point is greater than or equal to the gradient range threshold.

18. The apparatus of claim 12, wherein the adjusting comprises adjusting the mask position, and wherein the second obtaining code comprises:
exchanging code configured to cause the at least one processor to exchange a mask area and a non-mask area in the texture mapping based on the editing operation to obtain the target texture mapping.

19. A non-transitory computer-readable medium storing a program which, when executed by at least one processor, causes the at least one processor to at least:

obtain a first layer mapping of the virtual pet, the first layer mapping comprising a base appearance of the virtual pet;

generate a target texture mapping corresponding to the a target appearance feature in response to an editing operation on the target appearance feature, wherein the target appearance feature is different than the base appearance of the virtual pet;

obtain a target texture mapping of the virtual pet by overlaying the first layer mapping of the virtual pet with at least one layer of the target masked texture mapping, wherein each layer of the target masked texture mapping corresponds to a different target appearance feature;

based on the target texture mapping and the first layer mapping being different in size, scale the target texture mapping in accordance with a size of the first layer mapping such that a size of the scaled target texture mapping matches the size of the first layer mapping; and apply the target texture mapping to a preset three-dimensional model of the virtual pet.

\* \* \* \* \*